(12) United States Patent
Westermann

(10) Patent No.: US 10,753,375 B2
(45) Date of Patent: Aug. 25, 2020

(54) ACTUATING UNIT FOR A PROCESS VALVE AND PROCESS VALVE

(71) Applicant: Buerkert Werke GmbH & Co. KG, Ingelfingen (DE)

(72) Inventor: Jan Westermann, Ingelfingen (DE)

(73) Assignee: BUERKERT WERKE GMBH & CO. KG (DE)

(*) Notice: Subject to any disclaimer, the term of this patent is extended or adjusted under 35 U.S.C. 154(b) by 136 days.

(21) Appl. No.: 16/050,126

(22) Filed: Jul. 31, 2018

(65) Prior Publication Data

US 2019/0032800 A1 Jan. 31, 2019

(30) Foreign Application Priority Data

Jul. 31, 2017 (DE) .......................... 10 2017 117 335

(51) Int. Cl.
| | |
|---|---|
| *F16K 11/07* | (2006.01) |
| *F15B 13/04* | (2006.01) |
| *F16B 13/00* | (2006.01) |
| *F15B 13/00* | (2006.01) |
| *F15B 20/00* | (2006.01) |

(52) U.S. Cl.
CPC .......... *F15B 13/0401* (2013.01); *F16K 11/07* (2013.01); *F15B 20/001* (2013.01); *F15B 2013/006* (2013.01); *F15B 2013/041* (2013.01)

(58) Field of Classification Search
CPC ..... Y10T 137/87201; Y10T 137/87225; F16K 11/06–0787; F16K 17/0433; F15B 13/0401; F15B 13/0402; F15B 13/042; F15B 13/0431; F15B 13/044; F15B 2013/041; F15B 2013/006; F15B 2013/0428; F15B 21/003; F15B 2211/6355
See application file for complete search history.

(56) References Cited

U.S. PATENT DOCUMENTS

| | | | | |
|---|---|---|---|---|
| 3,407,834 A * | 10/1968 | Brandenberg | ............ | F15C 5/00 137/271 |
| 3,722,531 A * | 3/1973 | Verhart | ............... | F15B 13/0405 137/271 |
| 4,050,356 A * | 9/1977 | Jaggi | ....................... | F01L 23/00 91/306 |
| 4,640,311 A * | 2/1987 | Martinet | ............... | F15B 11/068 137/271 |

(Continued)

FOREIGN PATENT DOCUMENTS

| | | |
|---|---|---|
| DE | 1917598 B2 | 12/1977 |
| DE | 102011007629 B3 | 9/2012 |

(Continued)

*Primary Examiner* — Seth W. Mackay-Smith
(74) *Attorney, Agent, or Firm* — Dilworth IP, LLC

(57) ABSTRACT

An actuating unit for a process valve is described, which comprises a pilot valve unit, a separate removable seal arranged between two parts through which a fluid can flow, and a piston configured for the adjustment of the process valve. The seal has through openings for the passage of fluid, and the adjacent parts have holes, such that different holes are in fluid communication with each other via the through openings or are fluidically separated due to an intermediate wall portion of the seal depending on the fitting position of the seal. A process valve having such an actuating unit is furthermore described.

32 Claims, 10 Drawing Sheets

(56) References Cited

U.S. PATENT DOCUMENTS

| | | | | |
|---|---|---|---|---|
| 4,832,081 A * | 5/1989 | Amrhein | ............... | F16K 3/26 |
| | | | | 137/625.26 |
| 4,951,709 A * | 8/1990 | Kirkham | ............... | F15B 13/081 |
| | | | | 137/269 |
| 6,189,571 B1 * | 2/2001 | Hedlund | ............... | F15B 13/081 |
| | | | | 137/269 |
| 6,766,830 B2 * | 7/2004 | Rondreux | ............... | F15B 13/0807 |
| | | | | 137/269 |
| 7,322,270 B2 * | 1/2008 | Schmieding | ............... | F15B 20/008 |
| | | | | 60/657 |
| 7,357,141 B2 * | 4/2008 | Janietz | ............... | F15B 13/081 |
| | | | | 137/1 |
| 7,775,241 B2 * | 8/2010 | Biester | ............... | F16K 11/07 |
| | | | | 137/625.68 |
| 9,115,728 B2 * | 8/2015 | Arisato | ............... | F15B 13/0405 |
| 9,140,274 B2 * | 9/2015 | Liukkunen | ............... | F16K 11/0716 |
| 9,222,594 B2 * | 12/2015 | Liukkunen | ............... | F15B 13/0402 |
| 9,534,617 B2 | 1/2017 | Meinhof | | |
| 2015/0377264 A1 * | 12/2015 | Ooki | ............... | F15B 11/024 |
| | | | | 60/403 |
| 2017/0335992 A1 * | 11/2017 | Daraiseh | ............... | F16K 17/36 |
| 2018/0313459 A1 * | 11/2018 | Lucidera | ............... | F16K 11/0708 |

FOREIGN PATENT DOCUMENTS

| | | |
|---|---|---|
| DE | 102014019116 A1 | 6/2016 |
| GB | 1281103 A | 7/1972 |

\* cited by examiner

ACTUATING UNIT FOR A PROCESS VALVE AND PROCESS VALVE

FIELD OF THE INVENTION

The invention relates to an actuating unit for a process valve and to a process valve having an actuating unit.

BACKGROUND

Such actuating units and process valves are known from the prior art and are offered on the market in a wide variety of variants.

On the one hand, the diversity of variants results from the use of actuating units for process valves and of process valves in a wide range of applications having different requirements. Furthermore, actuating units and process valves having different properties are also required within a specific field of application.

Process valves which are closed in the absence of a control signal (so-called "normally closed" valves, abbreviated: NC valve) may for example be required within an application. Process valves which are open in the absence of a control signal (so-called "normally open" valves, abbreviated NO valve) may additionally be required in the same application. The control signal is in particular an electrical or pressure fluidic, i.e. hydraulic or pneumatic signal. The absence of a control signal may thus also be referred to a currentless or pressureless state. These characteristics are usually implemented within an actuating unit of a process valve. This means that a process valve may be configured as an NC or NO valve by being equipped with an appropriate actuating unit.

A further exemplary variant-creating characteristic of actuating units and process valves is the optional presence of spring-loaded valve elements. Due to the spring load, the NC or NO valves are provided with a spring-loaded valve element which urges the valve element into the closed or open position.

A further example is the realization of process valves as switching or control valves. Switching valves are often referred to as on/off valves. Control valves are also called proportional valves or continuously adjustable valves. Usually, these functionalities are also implemented in actuating units of process valves. A control valve differs from a switching valve in that in this valve, the transition from a valve position to another valve position may be realized in a continuous manner. It can take up any intermediate position. It is thus for example possible to adjust half of a flow rate via half of the piston stroke. A switching valve however can substantially take up only discrete valve positions. Usually, it does not permit any intermediate position.

This wide variety of variants causes high expenditures in the manufacture of the process valves and the associated actuating units. This applies among others to the associated production logistics and the subordinate stockkeeping of finished actuating units and process valves.

Therefore, the object of the present invention is to provide process valves and actuating units for process valves, by means of which the expenditure in the manufacture of such process valves and actuating units may be reduced while keeping the diversity of variants as required on the application side.

SUMMARY

The object is achieved by an actuating unit of the type initially mentioned, which comprises a pilot valve unit, a separate removable seal arranged between two parts through which a fluid can flow, and a piston configured for the adjustment of the process valve, the seal being adapted to take up different fitting positions which differ from each other by a rotation of the seal about at least one axis depending on its arrangement with respect to the two adjacent parts, the seal having through openings for the passage of fluid, and the adjacent parts having holes, of which a) at least one hole is connected to a pressure fluid inlet of the actuating unit, b) at least one hole is connected to a pressure fluid outlet of the actuating unit, c) at least one hole is connected to a first pressure chamber adjoining the piston, d) at least one hole is connected to a second pressure chamber adjoining the piston, e) at least one hole forms a pressure fluid inlet of the pilot valve unit, f) at least one hole forms a pressure fluid return of the pilot valve unit, and g) at least one hole forms a first pressure fluid working outlet of the pilot valve unit, wherein different holes are in fluid communication with each other via the through openings or are fluidically separated due to an intermediate wall portion of the seal depending on the fitting position of the seal, the through openings and the holes being arranged unsymmetrically to the at least one axis such that in a first fitting position, the seal brings the first pressure chamber adjoining the piston in fluid communication with the first pressure fluid working outlet of the pilot valve unit, and brings the second pressure chamber adjoining the piston in fluid communication with the pressure fluid outlet of the actuating unit, the first pressure chamber and the second pressure chamber being arranged on opposite sides of the piston, and wherein in a second fitting position, the seal brings the second pressure chamber in fluid communication with the first pressure fluid working outlet of the pilot valve unit, and brings the first pressure chamber in fluid communication with the pressure fluid outlet of the actuating unit. In the actuating unit according to the invention, the first pressure chamber or the second pressure chamber is selectively brought in fluid communication with the first pressure fluid working outlet of the pilot valve unit by the choice of the fitting position. The respective other pressure chamber is brought in fluid communication with the pressure fluid outlet of the actuating unit. In other words, the control of the piston which is configured for the adjustment of the process valve may be changed by the choice of the fitting position of the seal. It is thus possible by the use of identical parts, in particular of the same seal, the create two valve variants without having to accept a higher expenditure in the manufacture of the components of the actuating unit. The actuating unit according to the invention in particular also solves the problem of the so-called channel crossover. This problem assumes that in a first state, one of the pressure chambers is in fluid communication with a pressure fluid working outlet. In a second state, the other pressure chamber then has to be connected to the pressure fluid working outlet. On the basis of respectively fixed pressure ports of the pressure chambers and a fixed pressure fluid working outlet, the pressure fluid lines which extend without crossover in the first state have to cross in the second state. Due to this fact, it was up to now impossible in the prior art to use valves in which the control of the pressure chambers could be switched in this way. In the actuating unit according to the invention, the pressure fluid lines are guided offset to each other within the seal, such that the crossover is possible with any difficulty.

In the first fitting position and/or in the second fitting position, the seal may additionally bring the pressure fluid inlet of the actuating unit in fluid communication with the pressure fluid inlet of the pilot valve unit and the pressure fluid outlet of the actuating unit in fluid communication with the pressure fluid return of the pilot valve unit. All fluidic connections of the pilot valve unit thus extend through the seal. A compact structure of the actuating unit is therefore ensured. Furthermore, only one single seal is thus required such that the actuating unit may be composed of a comparatively small number of parts. The structure thereof is thus relatively simple.

The seal is preferably a flat seal. It may for example be made of plastic material, in particular an elastomer material. The seal may also be made of a fibre composite material. It is also possible to manufacture the seal of a metal material.

Advantageously, the seal can be transferred from the first into the second fitting position and vice versa by a rotation of substantially 180°, in particular about a seal longitudinal axis. The seal longitudinal axis extends within the seal and is thus in particular not perpendicular to the seal. This means that the change from the first into the second fitting position and vice versa may be performed in a very simple way. In other words, the seal is simply turned around, the upper side becomes the lower side and vice versa. No tool is in particular necessary therefor. Furthermore, an adjustment or precise positioning of the seal is unnecessary. It is thus possible to bring the seal into the appropriate fitting position during mounting of the actuating unit or of the associated process valve.

The seal and/or one of the adjacent parts can comprise markings by means of which it is possible to determine in which fitting position the seal is located. The markings can furthermore be used to indicate the correct reaching of a fitting position of the seal.

In the first fitting position of the seal, the pressure fluid outlet of the actuating unit, the pressure fluid return and the second pressure chamber can be in fluid communication with each other via a through opening which is configured as an elongated hole, and/or the first pressure fluid working outlet and the first pressure chamber can be in fluid communication with each other via a through opening which is configured as an elongated hole. Preferably, the remaining connections are realized by means of simple through holes having a substantially circular cross-section. The term "elongated hole" is to be understood in a wide sense. It can for example extend in a linear, curved or angled manner. It is thus possible to fluidically connect more than two, in particular three pressure fluid lines within the seal. Furthermore, such an elongated hole also permits the fluidic connection of pressure fluid lines to each other which have a certain offset with respect to each other. The problem of a channel crossover as already mentioned is thus in particular solved in a simple manner.

In the second fitting position of the seal, the pressure fluid outlet of the actuating unit, the pressure fluid return, and the first pressure chamber may additionally be in fluid communication with each other via a through opening which is configured as an elongated hole and/or the first pressure fluid working outlet and the second pressure chamber may be in fluid communication with each other via a through opening which is configured as elongated hole. The aforementioned effects and advantages are here also valid. Preferably, the remaining connections are again realized by means of simple through holes which have a substantially circular cross-section.

According to one embodiment, an elastic element, in particular a spring which pretensions the piston in the direction of an end position is arranged in the first pressure chamber or in the second pressure chamber. This elastic element is in particular used in actuating units and associated process valves which are realized as NC or NO valves. The elastic element ensures that in a state in which no control signal is applied to the actuating unit and the latter is thus in particular currentless or pressureless, a closed or open position of the associated process valve is achieved. In the present case, the piston is coupled to a valve element of the process valve such that an end position of the piston corresponds to an end position of the valve element, the end position of the valve element being in particular the closed or open position thereof. Further preferably, an elastic element is used in connection with a process valve acting as a switching valve, more precisely in connection with an actuating unit of a process valve acting as a switching valve.

One variant provides that the actuating unit comprises a pilot valve unit, a separate removable seal arranged between two parts through which a fluid can flow, and a piston configured for the adjustment of the process valve, the seal being adapted to take up different fitting positions which differ from each other by a rotation of the seal about at least one axis depending on its arrangement with respect to the two adjacent parts, the seal having through openings for the passage of fluid, and the adjacent parts having holes, of which a) at least one hole is connected to a pressure fluid inlet of the actuating unit,
b) at least one hole is connected to a pressure fluid outlet of the actuating unit,
c) at least one hole is connected to a first pressure chamber adjoining the piston,
d) at least one hole is connected to a second pressure chamber adjoining the piston,
e) at least one hole forms a pressure fluid inlet of the pilot valve unit,
f) at least one hole forms a pressure fluid return of the pilot valve unit,
g) at least one hole forms a first pressure fluid working outlet of the pilot valve unit, and
h) at least one hole forms a second pressure fluid working outlet of the pilot valve unit, wherein different holes are in fluid communication with each other via the through openings or are fluidically separated due to an intermediate wall portion of the seal depending on the fitting position of the seal, the through openings and the holes being arranged unsymmetrically to the at least one axis such that in a third fitting position, the seal brings the first pressure chamber adjoining the piston in fluid communication with the first pressure fluid working outlet of the pilot valve unit, and brings the second pressure chamber adjoining the piston in fluid communication with the second pressure fluid working outlet of the actuating unit, the first pressure chamber and the second pressure chamber being arranged on opposite sides of the piston. An additional variant of the actuating unit for a process valve is thus generated by means of the third fitting position of the seal. As already mentioned with reference to the first and the second fitting position, identical components are used to this end. The expenditure in the manufacture of the components for such an actuating unit is thus kept low. It corresponds in particular substantially to the expenditure in the manufacture of an actuating unit having one single variant. In the third fitting position of the seal, both the first pressure chamber and the second pressure chamber of the piston are in fluid communication with a pressure fluid working outlet of the pilot valve unit. It is thus possible to form a spring from pressure fluid, in particular a pneumatic spring in each pressure chamber. The hardness of the spring, more precisely the spring constant thereof can be adjusted via the supply of pressure fluid. Such an actuating unit is therefore particularly suited to control valves which are also called proportional valves or continuously adjustable valves.

In the third fitting position, the seal can bring the pressure fluid inlet of the actuating unit in fluid communication with the pressure fluid inlet of the pilot valve unit and bring the pressure fluid outlet of the actuating unit in fluid communication with the pressure fluid return of the pilot valve unit. All fluidic connections of the pilot valve unit thus extend through the seal. A compact structure of the actuating unit is thus ensured. Furthermore, only one seal is thus required, such that the actuating unit can be composed of a comparatively small number of parts. The structure thereof is thus relatively simple.

In the third fitting position of the seal, the first pressure chamber and the first pressure fluid working outlet can be in fluid communication with each other via a through opening which is configured as an elongated hole and/or the second pressure chamber and the second pressure fluid working outlet can be in fluid communication with each other via a through opening which is configured as an elongated hole. The remaining connections are realized by means of simple through holes which have a substantially circular cross-section. Regarding the effects and advantages, reference is made to the facts already mentioned to this point.

According to an alternative, the actuating unit for a process valve comprises a pilot valve unit, a separate removable seal arranged between two parts through which a fluid can flow, and a piston configured for the adjustment of the process valve, the seal being adapted to take up different fitting positions which differ from each other by a rotation of the seal about at least one axis depending on its arrangement with respect to the two adjacent parts, the seal having through openings for the passage of fluid, and the adjacent parts having holes, of which
- a) at least one hole is connected to a pressure fluid inlet of the actuating unit,
- b) at least one hole is connected to a pressure fluid outlet of the actuating unit,
- c) at least one hole is connected to a first pressure chamber adjoining the piston,
- d) at least one hole is connected to a second pressure chamber adjoining the piston,
- e) at least one hole forms a pressure fluid inlet of the pilot valve unit,
- f) at least one hole forms a pressure fluid return of the pilot valve unit,
- g) at least one hole forms a first pressure fluid working outlet of the pilot valve unit, and
- h) at least one hole forms a second pressure fluid working outlet of the pilot valve unit, wherein different holes are in fluid communication with each other via the through openings or are fluidically separated due to an intermediate wall portion of the seal depending on the fitting position of the seal, the through openings and the holes being arranged unsymmetrically to the at least one axis such that in a fourth fitting position, the seal brings the first pressure chamber adjoining the piston in fluid communication with the second pressure fluid working outlet of the pilot valve unit, and brings the second pressure chamber adjoining the piston in fluid communication with the first pressure fluid working outlet of the pilot valve unit, the first pressure chamber and the second pressure chamber being arranged on opposite sides of the piston. The fourth fitting position is thus associated with a fourth variant of the actuating unit. As already mentioned, the components necessary therefor are identical to those used in connection with the first, the second and the third fitting positions. The production expenditure of such an actuating unit is thus particularly low and substantially corresponds to the expenditure for the manufacture of an actuating unit having only one variant. Like in the third fitting position of the seal, both the first pressure chamber and the second pressure chamber are in fluid communication with a pressure fluid working outlet of the pilot valve unit in connection with the fourth fitting position. The actuating unit is thus in particular also suitable for control valves when the seal is in the fourth fitting position.

In the fourth fitting position, the seal can bring the pressure fluid inlet of the actuating unit in fluid communication with the pressure fluid inlet of the pilot valve unit and can bring the pressure fluid outlet of the actuating unit in fluid communication with the pressure fluid return of the pilot valve unit. All fluidic connections of the pilot valve unit thus extend through the seal. A compact structure of the actuating unit is thus ensured. Furthermore, only one seal is required, such that the actuating unit can be composed of a comparatively small number of parts. The structure thereof is thus relatively simple.

Preferably, the seal can be transferred from the third into the fourth fitting position and vice versa by a rotation of substantially 180°, in particular about a seal longitudinal axis. Reference is made to the above explanations.

In the fourth fitting position of the seal, the first pressure chamber and the second pressure fluid working outlet can be in fluid communication with each other via a through opening which is configured as an elongated hole and/or the second pressure chamber and the first pressure fluid working outlet can be in fluid communication with each other via a through opening which is configured as an elongated hole. The remaining connections are realized by means of simple through holes having a substantially circular cross-section. Reference is made to the above explanations concerning elongated holes.

It is noted that the designation of the fitting positions as first, second, third and fourth fitting positions has only been chosen to clearly distinguish the different fitting positions. All fitting positions can occur independently from each other and in any possible combinations thereof. Thus, the presence of one fitting position being designated by one of the numbers (first, second, third and fourth fitting position) mentioned above does not imply the presence of the fitting positions being designated by numbers being lower than that specific number, e.g. the presence of a third fitting position does not imply a first and a second fitting position.

In one variant, the pilot valve unit comprises a 3/2-way valve, wherein the pressure fluid inlet of the pilot valve unit is in fluid communication with a pressure fluid inlet of the 3/2-way valve, the pressure fluid return of the pilot valve unit is in fluid communication with a pressure fluid return of the 3/2-way valve, and the first pressure fluid working outlet of the pilot valve unit is in fluid communication with a pressure fluid working outlet of the 3/2-way valve. The 3/2-way valve preferably comprises an electrical or electromagnetic actuator and is therefore actuated electrically or electromagnetically. Such valves have an simple and compact structure. Furthermore, they are established as robust and reliable in the prior art. A pilot valve unit having a 3/2-way valve is particularly well suited to an actuating unit cooperating with a process valve configured as a switching valve.

Alternatively, the pilot valve unit can comprise two 3/2-way valves, wherein in particular in the first and/or in the second fitting position of the seal, the pressure fluid inlet of the pilot valve unit may be a pressure fluid inlet of a first 3/2-way valve, the pressure fluid return of the pilot valve unit may be a pressure fluid return of a second 3/2-way valve, and the first pressure fluid working outlet of the pilot valve unit may be in fluid communication with a pressure fluid working outlet of the first 3/2-way valve, a pressure fluid return of the first 3/2-way valve, a pressure fluid inlet of the second 3/2-way valve and a pressure fluid working outlet of the second 3/2-way valve. The 3/2-way valves preferably each comprise an electrical or electromagnetic actuator and are therefore actuated electrically or electromagnetically. Such a pilot valve unit is particularly suited to an actuating unit cooperating with a process valve which is configured as a control valve. The two 3/2-way valves constitute a robust and reliable solution therefor. Furthermore, this structure is particular compact and simple.

According to a further alternative, the pilot valve unit can comprise two 3/2-way valves, wherein in particular in the third and/or in the fourth fitting position of the seal, the pressure fluid inlet of the pilot valve unit may be in fluid communication with a pressure fluid inlet of a first 3/2-way valve and with a pressure fluid inlet of a second 3/2-way valve, the pressure fluid return of the pilot valve unit may be in fluid communication with a pressure fluid return of the first 3/2-way valve and with a pressure fluid return of a second 3/2-way valve, the first pressure fluid working outlet of the pilot valve unit may be in fluid communication with a pressure fluid working outlet of the first 3/2-way valve, and the second pressure fluid working outlet of the pilot valve unit may be in fluid communication with a pressure fluid working outlet of the second 3/2-way valve. The 3/2-way valves preferably each comprise an electrical or electromagnetic actuator and are thus actuated electrically or electromagnetically. Such a valve arrangement is particularly suited to actuating units which are formed as so-called double-action drives for process valves. Actuating units are here involved, through which the process valve acts as a switching valve. The first pressure chamber or the second pressure chamber of the piston can be selectively acted upon with pressure fluid. The respective other pressure chamber is ventilated. An additional loading of the piston using an elastic element is therefore unnecessary.

The pilot valve unit can also comprise a 4/2-way valve, wherein in particular in the third and/or in the fourth fitting position of the seal, the pressure fluid inlet of the pilot valve unit may be in fluid communication with a pressure fluid inlet of the 4/2-way valve, the pressure fluid return of the pilot valve unit may be in fluid communication with a pressure fluid return of the 4/2-way valve, the first pressure fluid working outlet of the pilot valve unit may be in fluid communication with a first pressure fluid working outlet of the 4/2-way valve, and the second pressure fluid working outlet of the pilot valve unit may be in fluid communication with a second pressure fluid working outlet of the 4/2-way valve. The 4/2-way valve preferably comprises an electrical or electromagnetic actuator and is thus actuated electrically or electromagnetically. The actuating unit having a 4/2-way valve is also particularly well suited to so-called double-action drives for process valves. Such a structure of the pilot valve unit is at the same time particularly compact. It is also possible to use a 4/3-way valve instead of a 4/2-way valve.

The actuating unit according to the invention may be a pneumatic piston actuating drive or also a pneumatic membrane actuating drive.

The object is furthermore achieved by a process valve having an actuating unit according to the invention. Such a process valve may be provided in many different variants without the expenditure for the manufacture of such a process valve being increased in comparison with a process valve having only one variant. This is substantially achieved in that the components of the process valve are identical in all variants and only a fitting position of the seal is modified.

BRIEF DESCRIPTION OF THE DRAWINGS

The invention is explained below with reference to different example embodiments which are shown in the accompanying drawings. The drawings show.

DETAILED DESCRIPTION

Figure 1:
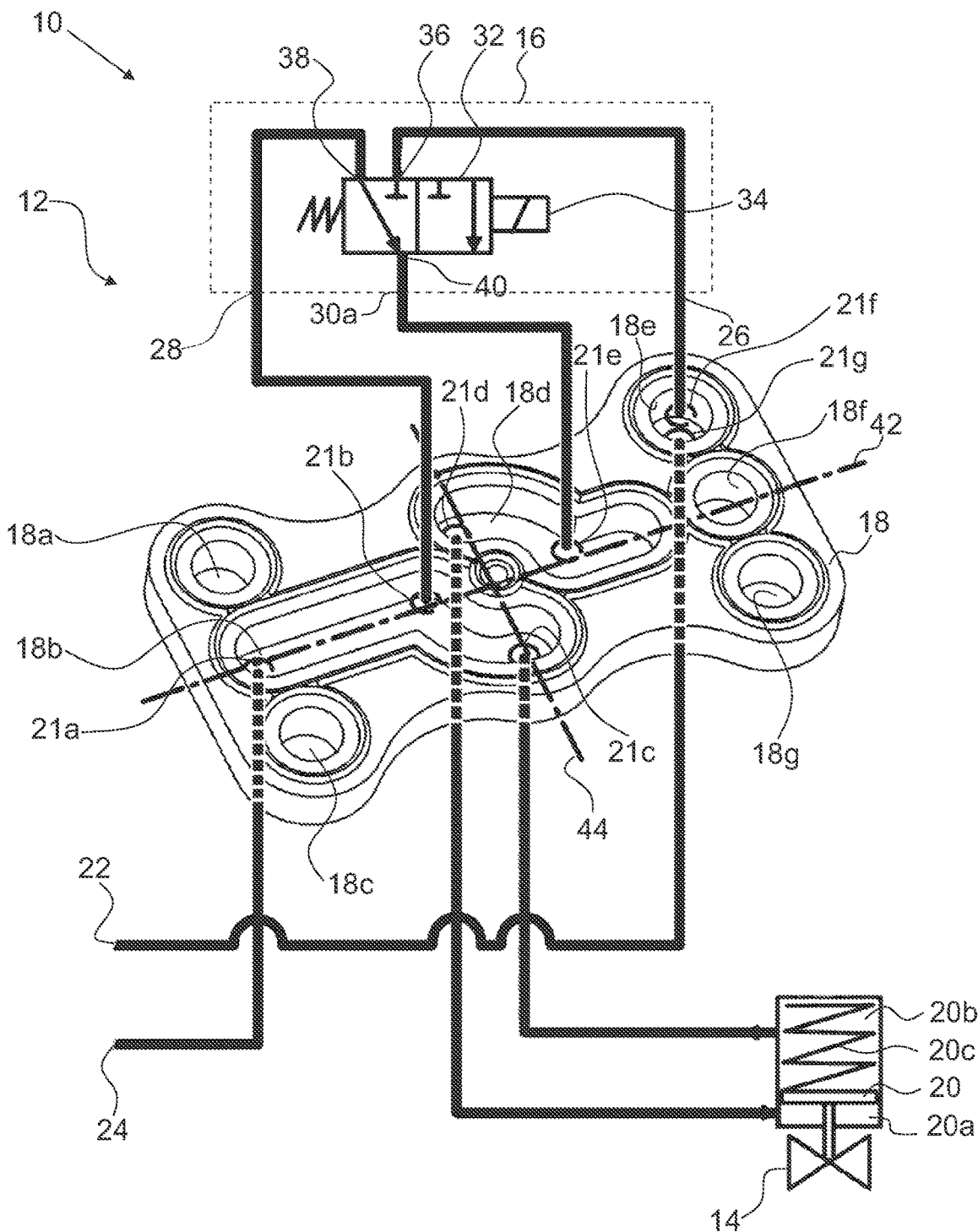
FIG. 1 shows a process valve according to the invention comprising an actuating unit according to the invention in a first embodiment, the seal taking up a first fitting position and being shown in a perspective view.
Figure 2:
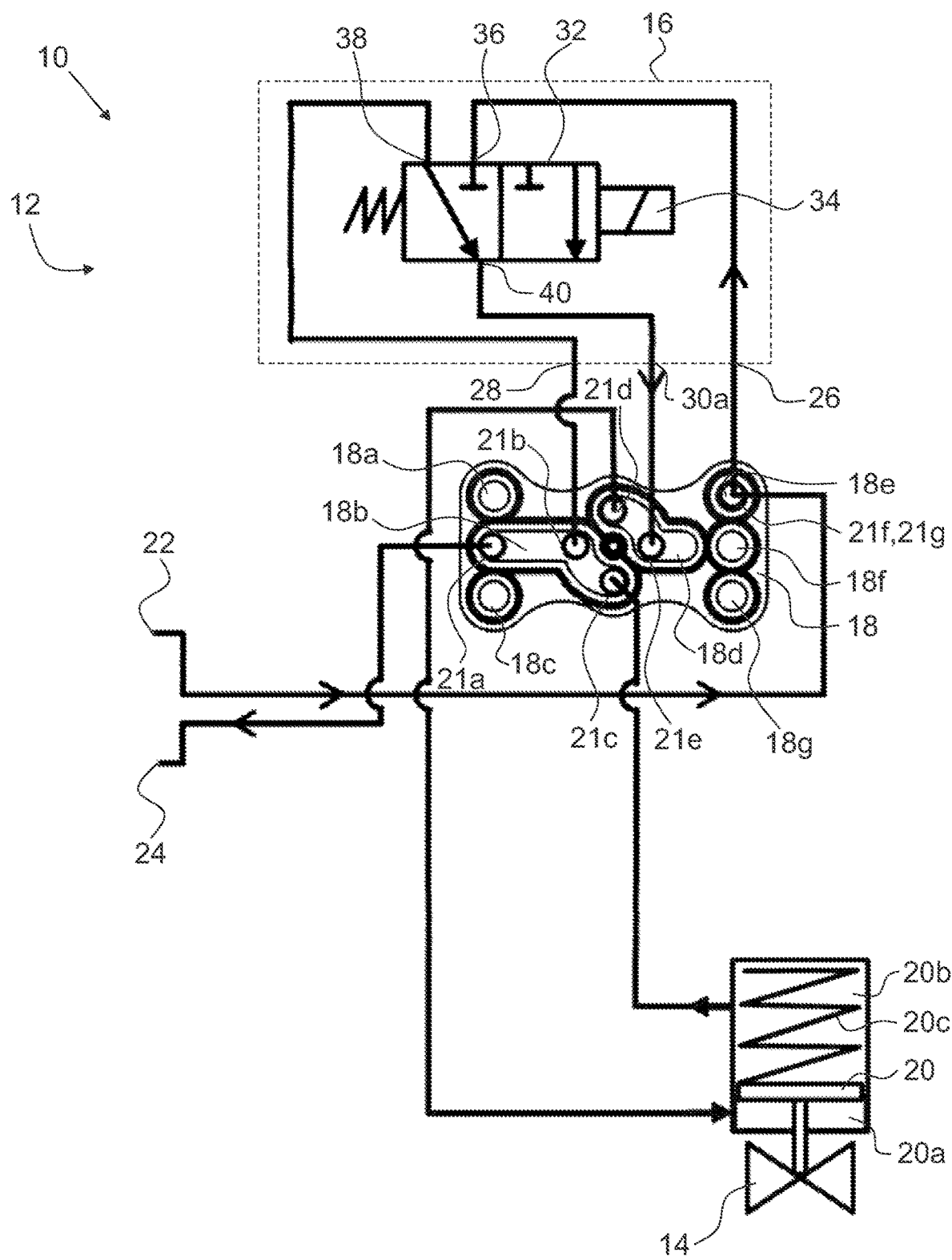
FIG. 2 shows the process valve according to the invention comprising the actuating unit according to the invention of FIG. 1, the seal being shown in a top view.

FIGS. 1 and 2 show a process valve 10 comprising an actuating unit 12 according to a first embodiment and a merely symbolically represented valve unit 14. The actuating unit 12 may also be referred to as pilot unit of the valve unit 14.

The actuating unit 12 comprises a pilot valve unit 16, a separate removable seal 18 and a piston 20 which is configured for the adjustment of the process valve 10, more precisely of the valve unit 14 and which is adjoined by a first pressure chamber 20*a* and a second pressure chamber 20*b*.

The two pressure chambers 20*a*, 20*b* are arranged on opposite sides of the piston 20 and are preferably provided in a cylinder which is not referred in detail and in which the piston 20 is also guided.

Furthermore, an elastic element 20c is provided in the second pressure chamber 20b and is a spring in the represented embodiment. The elastic element 20c urges the piston 20 in the direction of an end position which corresponds to the respective lower end position of the piston 20 in FIGS. 1 and 2.

The seal 18 is arranged between two parts through which a fluid flows and of which holes 21a-21g are represented merely schematically. The upper first part can optionally also comprise the pilot valve unit 16.

In the represented embodiment, the holes 21b, 21e and 21f are provided in a part located above the seal 18 in FIGS. 1 and 2, and the holes 21a, 21c, 21d and 21g are provided in a part located below the seal in FIGS. 1 and 2.

The hole 21d is in fluid communication with the first pressure chamber 20a, and the hole 21c is in fluid communication with the second pressure chamber 20b.

Further features of the two parts through which a fluid flows are not visible for reasons of clarity. The two parts are located on opposite sides of the seal which is configured as flat seal, the seal sealing the parts with respect to each other.

The supply of the actuating unit 12 with pressure fluid is realized via a pressure fluid inlet 22 of the actuating unit 12. The latter is in fluid communication with the hole 21g.

The pressure fluid can escape from the actuating unit 12 via a pressure fluid outlet 24 of the actuating unit 12. The pressure fluid outlet 24 is in fluid communication with the hole 21a. The appropriate line running may be realized exclusively in the second part, i.e. in the part resting on the lower side of the seal.

The pilot valve unit 16 has a pressure fluid inlet 26, a pressure fluid return 28 and a first pressure fluid working outlet 30a.

The hole 21f forms the pressure fluid inlet 26 or is in fluid communication therewith.

The hole 21b is in fluid communication with the pressure fluid return 28 of the pilot valve unit 16 or forms the latter, which is synonymous within the meaning of the present invention.

Concerning the pressure fluid working outlet 30a, the latter is in fluid communication with the hole 21e or is formed thereby, which is also synonymous.

In the represented embodiment, the pilot valve unit 16 comprises a 3/2-way valve 32 having an electromagnetic actuator 34.

The pressure fluid inlet 26 of the pilot valve unit 16 is in fluid communication with a pressure fluid inlet 36 of the 3/2-way valve 32, the pressure fluid return 28 of the pilot valve unit 16 is in fluid communication with a pressure fluid return 38 of the 3/2-way valve 32, and the first pressure fluid working outlet 30a of the pilot valve unit 16 is in fluid communication with a pressure fluid working outlet 40 of the 3/2-way valve 32.

The seal is explained in detail below. The seal 18 comprises through openings 18a-18g.

Different holes 21a-21g can be in fluid communication with each other via the through openings 18a-18g or are fluidically separated due to an intermediate wall portion of the seal 18 depending on the fitting position of the seal 18.

In the represented first embodiment, the seal 18 is in a first fitting position in which the pressure fluid inlet 22 of the actuating unit 12 is in fluid communication with the pressure fluid inlet 26 of the pilot valve unit 16 via the through openings 18e.

In other words, the seal 18 and, in particular, the through opening 18e are arranged between the two parts through which fluid flows such that the hole 21f and the hole 21g run into the through the opening 18e and are thus in fluid communication.

The pressure fluid outlet 24 of the actuating unit 12 is in fluid communication with the pressure fluid return 28 of the pilot valve unit 16. This is realized via the through opening 18b.

The second pressure chamber 20b is furthermore in fluid communication with the pressure fluid outlet 24 of the actuating unit 12 via the through opening 18b.

In other words, the seal 18 is thus arranged such that the holes 21a, 21b and 21c run into the through opening 18b and a fluidic communication is thus established between these holes 21a, 21b and 21c.

The through opening 18b is here configured as elongated hole, in the present case as a substantially L-shaped elongated hole.

Furthermore, the first pressure chamber 20a is in fluid communication with the first pressure fluid working outlet 30a of the pilot valve unit 16 via the through opening 18d.

To this end, the seal 18 is positioned such that the holes 21d and 21e are fluidically coupled via the through opening 18d.

The through opening 18d is also configured as an elongated hole, here also as an L-shaped elongated hole.

In a first position of the 3/2-way valve 32 represented in FIGS. 1 and 2, both the first pressure chamber 20a and the second pressure chamber 20b are in fluid communication with the pressure fluid outlet 24. Due to the urging by the elastic element 20c, the piston 20 is in this state in an end position which is a lower position in FIG. 1.

Due to the spring load, the first position of the 3/2-way valve 32 corresponds to that position which is taken up by the valve in a currentless state.

A so-called NC valve ("normally closed" valve) can thus be realized by means of the actuating unit 12, if the lower end position of the piston 20 in FIG. 1 corresponds to a closed position of the process valve 10, in particular of the valve unit 14.

By analogy, a so-called NO valve ("normally open" valve) can be realized if the lower end position of the piston 20 in FIG. 1 corresponds to an open position of the process valve 10, in particular of the valve unit 14.

In case the 3/2-way valve 32 takes up a second position which is offset to the left with respect to the position represented in FIGS. 1 and 2, the first pressure chamber 20a is fluidically connected to the pressure fluid inlet 22 of the actuating unit 12. The second pressure chamber 20b is furthermore fluidically connected to the pressure fluid outlet 24. The second position may also be referred to as an actuated state of the 3/2-way valve 32.

The piston 20 is thus transferred into its upper end position in FIG. 1 opposite to the urging of the elastic element 20c by means of the pressure fluid. The process valve 10, more precisely the valve unit 14, simultaneously comes into the position associated with the upper end position.

If the process valve 10 is an NO valve, the closed position is involved. If the process valve 10 is an NC valve, the open position is involved.

The process valve 10 according to the first embodiment is a so-called switching valve having a single-action drive.

Figure 3:
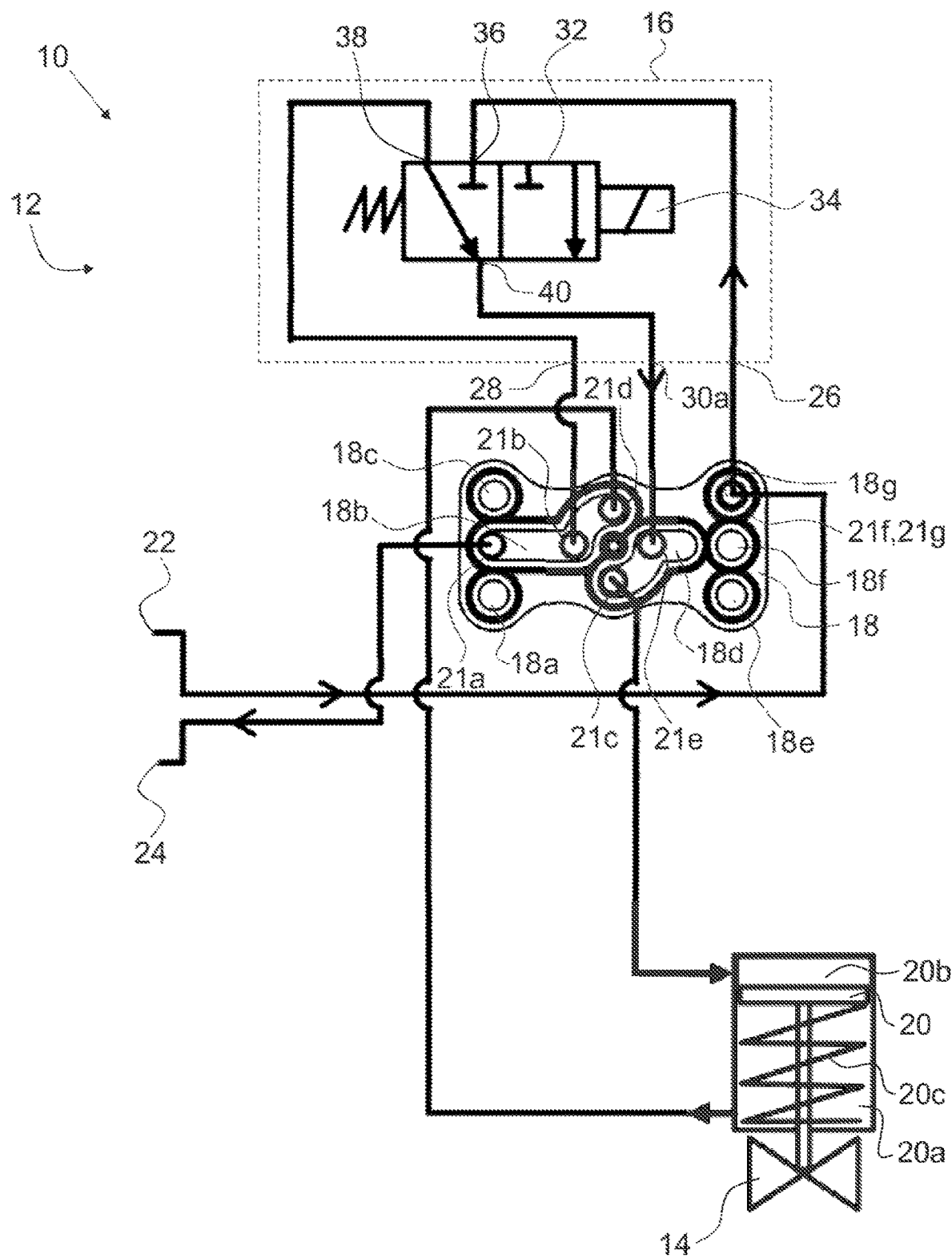
FIG. 3 shows the process valve according to the invention comprising the actuating unit according to the invention of FIG. 2, the seal taking up a second fitting position.

FIG. 3 shows a variant of the actuating unit 12 of FIGS. 1 and 2.

It differs from the actuating unit 12 of FIGS. 1 and 2 in that the seal 18 is now in a second fitting position.

Starting from the first fitting position, the second fitting position can be achieved by a rotation of the seal 18 of substantially 180°. The rotation is performed about a central seal longitudinal axis 42 (see FIGS. 1 and 10).

In the second fitting position, the pressure fluid inlet 22 of the actuating unit 12 is now in fluid communication with the pressure fluid inlet 26 of the pilot valve unit 16. This is realized via the through opening 18g, the seal 18 being positioned such that both the hole 21f which is in fluid communication with the pressure fluid inlet 26, and also the hole 21g which is fluidically coupled to the pressure fluid inlet 22, run into the through opening 18g.

The pressure fluid outlet 24 of the actuating unit 12 is in fluid communication with the pressure fluid return 28 of the pilot valve unit 16 via the through opening 18b.

This also applies to the pressure chamber 20a which is also in fluid communication with the pressure fluid outlet 24 of the actuating unit 12 via the through opening 18b.

In the second fitting position of the seal 18, the holes 21a, 21b and 21d thus run into the through opening 18b.

The second pressure chamber 20b is further in fluid communication with the first pressure fluid working outlet 30a of the pilot valve unit 16 via a through opening 18d. To this end, the seal 18 is arranged such that the holes 21c and 21e run into the through opening 18d.

A further difference to the variant shown in FIGS. 1 and 2 is that the elastic element 20c is arranged only in the first pressure chamber 20a. The elastic element 20c thus now urges the piston 20 in the direction of an end position which corresponds to the upper end position of the piston 20 in FIG. 3.

The through openings 18b and 18d are further configured as elongated holes such that in the second fitting position of the seal 18, the pressure fluid outlet 24 of the actuating unit 12, the pressure fluid return 28 and the first pressure chamber 20a are in fluid communication with each other via the through opening 18b which is configured as an elongated hole.

The same applies to the first pressure fluid working outlet 30a and the second pressure chamber 20b which are in fluid communication with each other via the through opening 18d which is configured as an elongated hole.

The function of the actuating unit 12 represented in FIG. 3 is thus reversed in two aspects in comparison to the actuating unit represented in FIGS. 1 and 2.

On the one hand, the piston 20 is now located in the upper end position in FIG. 3 in a currentless state of the 3/2-way valve 32. This is due to the modified arrangement of the elastic element 20c, wherein the switching positions of the 3/2-way valve 32 were maintained.

On the other hand, the second pressure chamber 20b may now be acted upon with pressure fluid by a switching of the 3/2-way valve 32 into a position which is offset to the left in comparison with the representation in FIG. 3, such that the piston 20 is transferred into its lower end position in FIG. 3 opposite to the urging by the elastic element 20c.

The process valve 10 represented in FIG. 3 is therefore also a switching valve having a single-action drive.

It can be configured as an NO or NC valve analogously to the above explanations, an NO valve becoming an NC valve or vice versa by the transfer of the seal 18 from the first fitting position (see FIGS. 1 and 2) into the second position (see FIG. 3). The same applies to a transfer of the seal 18 from the second fitting position (see FIG. 3) into the first fitting position (see FIGS. 1 and 2).

Figure 4:
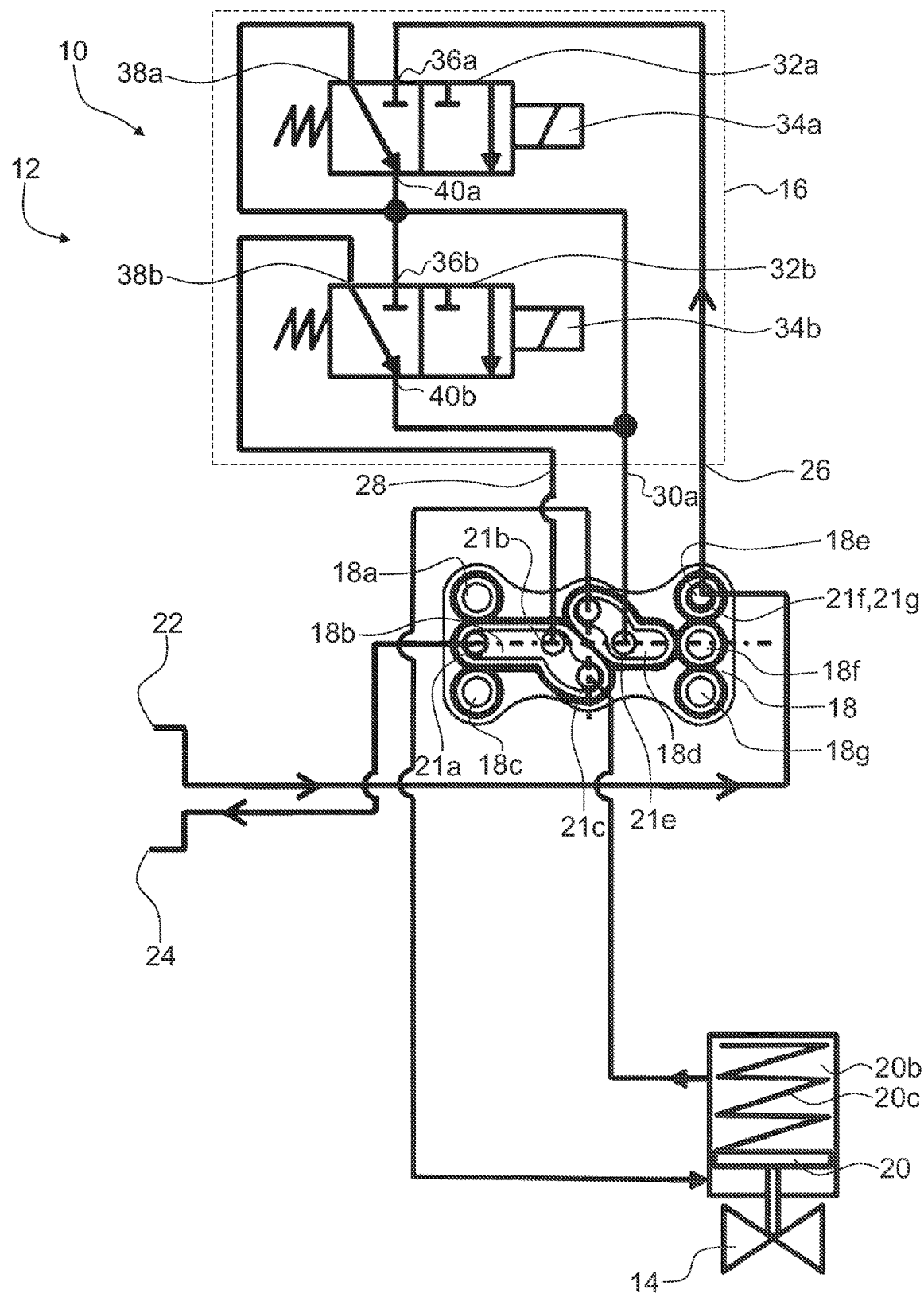
FIG. 4 shows a process valve according to the invention comprising an actuating unit according to the invention in a second embodiment, the seal taking up a first fitting position.

FIG. 4 shows a second embodiment of the actuating unit 12 and of the process valve 10.

The seal 18 is located in the first fitting position (see FIGS. 1 and 2). The arrangement of the elastic element 20c also corresponds to that of FIGS. 1 and 2.

Concerning the interconnection of the pressure chambers 20a, 20b with the pressure fluid inlet 22, the pressure fluid outlet 24 and the pilot valve unit 16, reference is therefore made to the above explanations.

In contrast to the first embodiment, the pilot valve unit 16 however now comprises two 3/2-way valves.

In accordance with the designations of the 3/2-way valve 32 of FIGS. 1 to 3, a first 3/2-way valve is designated by 32a and a second 3/2-way valve by 32b.

The associated pressure fluid inlets, pressure fluid returns, pressure fluid working outlets and actuators are accordingly provided with the suffixes a and b.

The fluidic interconnection of the two 3/2-way valves 32a, 32b within the pilot valve unit 16 is now such that the pressure fluid inlet 26 of the pilot valve unit 16 is in fluid communication with the pressure fluid inlet 36a of the first 3/2-way valve 32a.

The pressure fluid return 28 of the pilot valve unit 16 is fluidically coupled to the pressure fluid return 38b of the second 3/2-way valve 32b.

The first pressure fluid working outlet 30a of the pilot valve unit 16 is simultaneously in fluid communication with the pressure fluid working outlet 40a of the first 3/2-way valve 32a, the pressure fluid return 38a of the first 3/2-way valve 32a, the pressure fluid inlet 36b of the second 3/2-way valve 32b and the pressure fluid working outlet 40b of the second 3/2-way valve.

In contrast to the first embodiment, the process valve 10 according to the second embodiment acts as a so-called control valve.

In the unactuated state of both 3/2-way valves 32a, 32b, both pressure chambers 20a, 20b are in fluid communication with the pressure fluid outlet 24.

Due to the urge by the elastic element 20c, the piston 20 is in its lower end position. This may be associated with an open or closed state of the process valve 10, more precisely of the valve unit 14 such that the process valve 10 acts as an NO valve or as an NC valve.

By a simultaneous actuation of the first 3/2-way valve 32a and of the second 3/2-way valve 32b, the first pressure chamber 20a can be brought in in fluid communication with the pressure fluid inlet 22. The fluid communication thereof with the pressure fluid outlet 24 is simultaneously interrupted.

In case the 3/2-way valve 32b is not actuated, the first pressure chamber 20a is in fluid communication with the pressure fluid outlet 24 such that the fluid does not act. The bypass line extending between the 3/2-way valves 32a and 32b at the right about the 3/2-way valve 32b then runs into a line which is led from the 3/2-way valve 32b to the pressure chamber 20a.

In case the first 3/2-way valve 32a is not actuated, a supply of pressure fluid towards the first pressure chamber 20a cannot be realized.

Consequently, a predefined pressure in the first pressure chamber 20a may be adjusted or a pressure present there may be controlled by a coordinated actuation of the two 3/2-way valves 32a, 32b. The position of the piston 20 can thus also be controlled.

Figure 5:
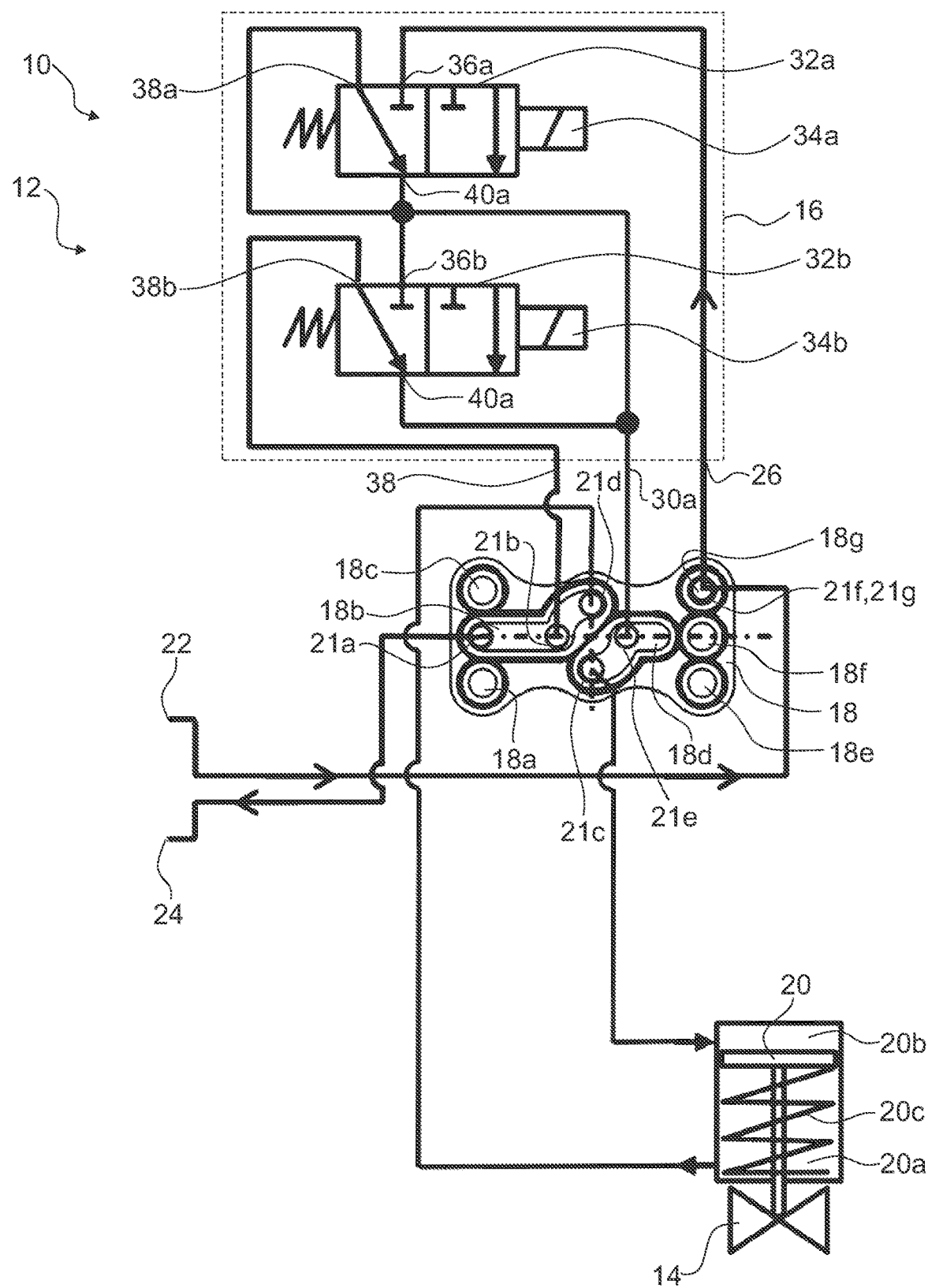
FIG. 5 shows the process valve according to the invention comprising the actuating unit according to the invention of FIG. 4, the seal taking up a second fitting position.

FIG. 5 shows a variant of the second embodiment (see FIG. 4).

The design of the pilot valve unit 16 corresponds to that of FIG. 4. Reference is made to the appropriate explanations.

However, the seal 18 is now in the second rotated fitting position. The interconnection of the pressure chambers 20a, 20b with the pilot valve unit 16, the pressure fluid inlet 22 and the pressure fluid outlet 24 corresponds to that of FIG. 3 such that concerning this, reference is made to the explanations.

Analogously to the process valve 10 of FIG. 4, the process valve 10 represented in FIG. 5 is also a control valve.

It can be configured as an NO or NC valve analogously to the above explanations, an NO valve becoming an NC valve or vice versa by the transfer of the seal 18 from the first fitting position (see FIG. 4) into the second position (see FIG. 5). The same applies to a transfer of the seal 18 from the second fitting position (see FIG. 5) into the first fitting position (see FIG. 4).

Alternatively, or additionally, the piston 20 may also be inverted for a transfer of an NO valve to an NC valve. The elastic element 20c is not displaced with respect to the piston 20 such that it is transferred from a position represented in the upper part to a position represented in the lower part or vice versa.

Figure 6:
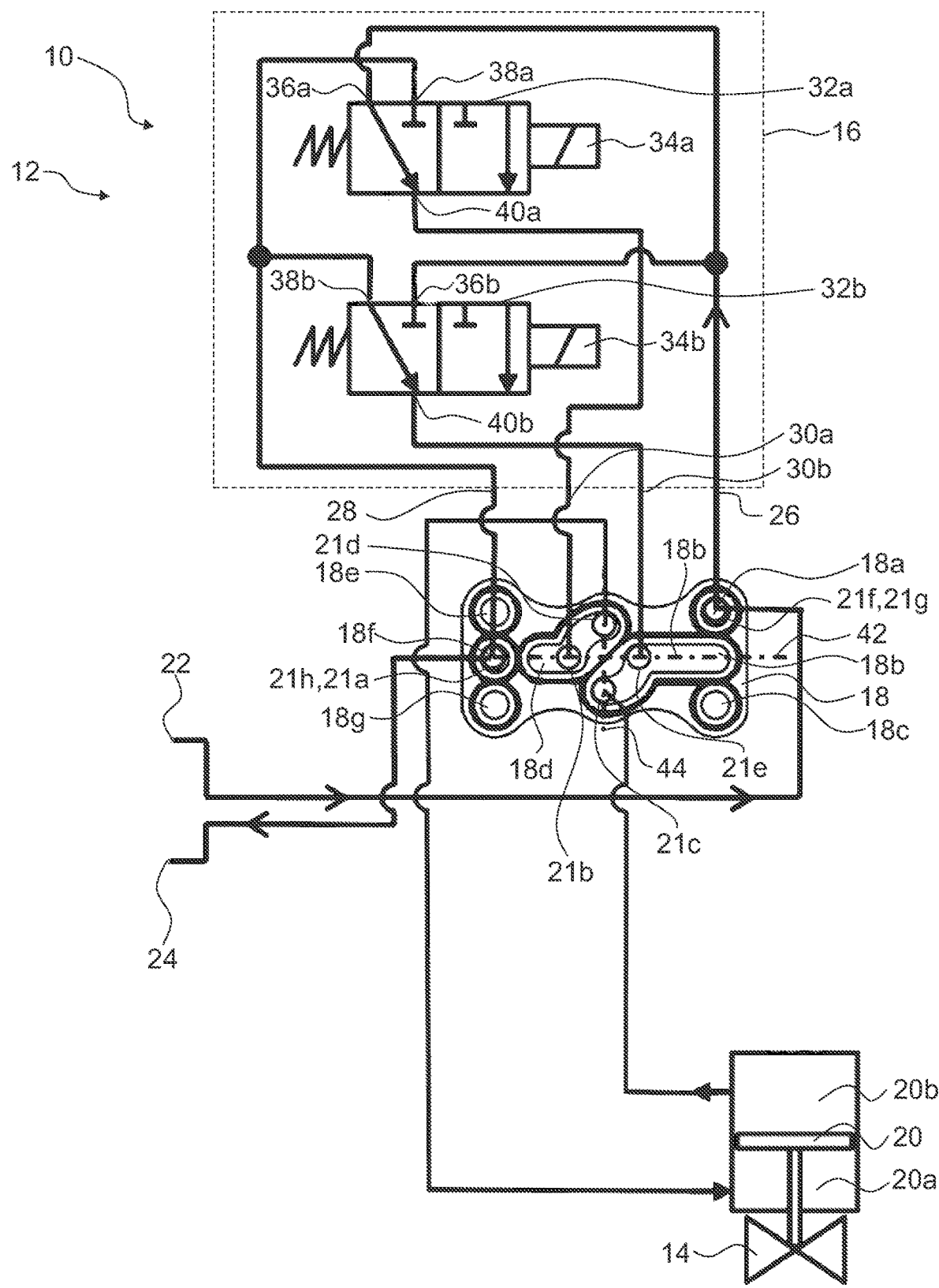
FIG. 6 shows a process valve according to the invention comprising an actuating unit according to the invention in a third embodiment, the seal taking up a third fitting position.

A third embodiment of the actuating unit 12 and of the process valve 10 is visible in FIG. 6.

The pilot valve unit 16, like the pilot valve unit 16 shown in FIGS. 4 and 5, comprises a first 3/2-way valve 32a and a second 3/2-way valve 32b. The 3/2-way valves 32a, 32b are however now interconnected in a different manner.

In comparison with the embodiment represented in FIG. 5, the positions of the pressure fluid inlet 36a and of the pressure fluid return 38a on the 3/2-way valve 32a are exchanged.

The pressure fluid inlet 26 of the pilot valve unit 16 is in fluid communication with the pressure fluid inlet 36a of the first 3/2-way valve 32a and with the pressure fluid inlet 36b of the second 3/2-way valve 32b. The pressure fluid return 28 of the pilot valve unit 16 is in fluid communication with the pressure fluid return 38a of the first 3/2-way valve 32a and with the pressure fluid return 38b of the second 3/2-way valve 32b.

The first pressure fluid working outlet 30a of the pilot valve unit 16 is in fluid communication with the pressure fluid working outlet 40a of the first 3/2-way valve 32a.

In contrast to the first and the second embodiment, a second pressure fluid working outlet 30b of the pilot valve unit 16 is now additionally provided, which is in fluid communication with the pressure fluid working outlet 40b of the second 3/2-way valve 32b.

Like in the previous embodiments, the hole 21d is in fluid communication with the first pressure chamber 20a, and the hole 21c is in fluid communication with the second pressure chamber 20b.

The pressure fluid inlet 22 of the actuating unit 12 is also in fluid communication with the hole 21g, and the pressure fluid outlet 24 of the actuating unit 12 is in fluid communication with the hole 21a.

The part through which fluid flows and which is in the figures (see in particular FIG. 1) located below the seal 18 (see in particular FIG. 1) and has the holes 21a, 21c, 21d and 21g is therefore identical to the previous embodiments.

Concerning the part through which a fluid flows and which is located above the seal 18 (see also FIG. 1), the pressure fluid inlet 26 is still in fluid communication with the hole 21f or is formed thereby.

In contrast thereto, the first pressure fluid working outlet 30a is however now in fluid communication with the hole 21b and the second pressure fluid working outlet 30b in fluid communication with the hole 21e. Alternatively, the pressure fluid working outlet 30a is formed by the hole 21b and the pressure fluid working outlet 30b is formed by the hole 21e, which is, as already mentioned, synonymous for the invention.

The pressure fluid return 28 is now in fluid communication with a hole 21f or is formed thereby, the hole 21h being arranged opposite the hole 21a and being not provided in the previous embodiments.

The seal 18 is now in a third fitting position. Starting from the first fitting position (see FIGS. 1, 2 and 4, and FIG. 10), this position can be achieved by a rotation of substantially 180° about a seal transverse axis 44.

In this third fitting position, the pressure fluid inlet 22 of the actuating unit 12 is in fluid communication with the pressure fluid inlet 26 of the pilot valve unit 16. This fluid communication is realized via the through opening 18a.

In other words, the seal 18 is arranged with respect to the holes 21f and 21g such that the latter are in fluid communication with each other.

The pressure fluid outlet 24 of the actuating unit 12 is in fluid communication with the pressure fluid return 28 of the pilot valve unit 16 via the through opening 18f.

To this end, the seal 18 is arranged such that the holes 21a and 21h are in fluid communication with the through opening 18f.

The first pressure chamber 20a is in fluid communication with the first pressure fluid working outlet 30a of the pilot valve unit 16 via the through opening 18d. The seal 18 is therefore positioned such that the holes 21b and 21d are in fluid communication with the through opening 18d.

The second pressure chamber 20b is in fluid communication with the second pressure fluid working outlet 30b of the pilot valve unit 16 via the through opening 18b. To this end, the holes 21c and 21e are also in fluid communication with the through opening 18b, which is obtained by an appropriate arrangement of the seal 18.

Due to the modified fitting position of the seal 18, the first pressure chamber 20a and the first pressure fluid working outlet 30a are now in fluid communication with each other via the through opening 18d which is configured as an elongated hole.

The same applies to the second pressure chamber 20b and the second pressure fluid working outlet 30b which are in fluid communication with each other via the through opening 18b which is configured as an elongated hole.

A further difference to the previous embodiments is that no elastic element 20c is present anymore.

In the unactuated state of the 3/2-way valves 32a, 32b, the first pressure chamber 20a is now fluidically connected to the pressure fluid inlet 22. In this situation, the piston 20 is therefore in the upper end position of FIG. 6. A closed or open positon of the process valve 10, more precisely of the valve unit 14 may be associated therewith, such that the process valve 10 generally acts as an NC or NO valve.

By an actuation of the first 3/2-way valve 32a, the first pressure chamber 20a is brought in fluid communication with the pressure fluid outlet 24. Furthermore, an actuation of the second 3/2-way valve causes the second pressure chamber 20b to be brought in fluid communication with the pressure fluid inlet 22.

Advantageously, the first 3/2-way valve 32a and the second 3/2-way valve 32b are thus actuated simultaneously such that the piston 20 takes up the lower end position of FIG. 6.

The piston can thus be actively displaced in both end positions, which is why the actuating unit 12 according to the third embodiment may also be referred to as double-action drive.

The process valve 10 acts as a so-called switching valve if the process valve 10 is controlled such that in the pressure chambers 20a, 20b, only the pressure prevailing at the pressure fluid inlet 22 or the pressure prevailing at the pressure fluid outlet 24 is selectively present in the pressure chambers 20a, 20b and the pressure chamber 20a, 20b in fluid communication with the pressure fluid inlet 22 is always completely filled. In other words, the actuating periods of the 3/2-way valves 32a, 32b have to be chosen so long that the pressure chambers 20a, 20b are always completely filled to realize a switching valve.

Figure 7:
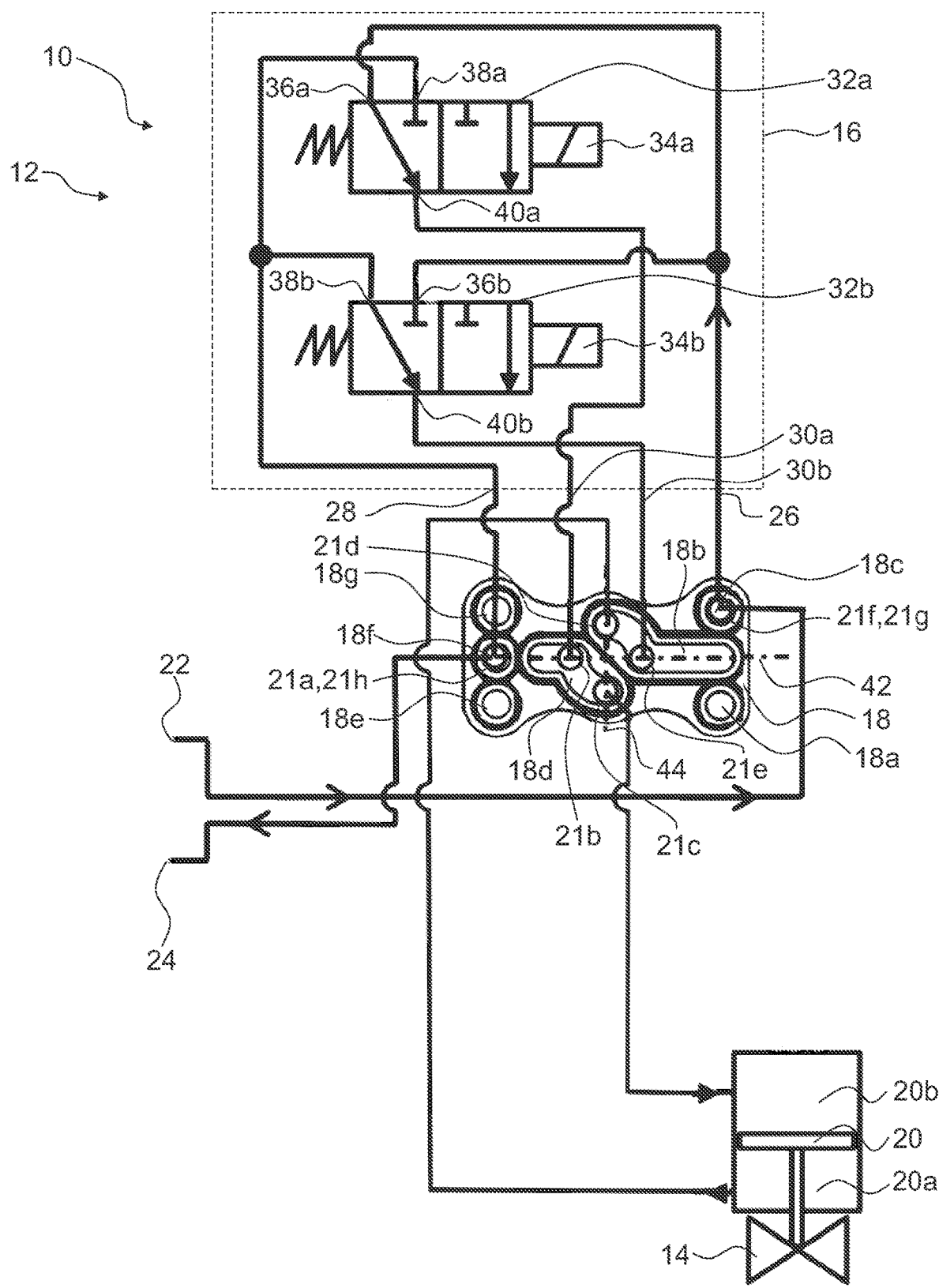
FIG. 7 shows the process valve according to the invention comprising the actuating unit according to the invention of FIG. 6, the seal taking up a fourth fitting position.

FIG. 7 shows a variant of the third embodiment.

This variant differs from the variant shown in FIG. 6 merely in the fitting position of the seal 18. In the variant according to FIG. 7, the seal 18 is namely in a fourth fitting position.

Starting from the third fitting position (see FIGS. 6 and 10), this position can be achieved by a rotation of substantially 180° about the seal longitudinal axis 42.

Furthermore, starting from the second fitting position, the fourth fitting position of the seal 18 can also be taken up by a rotation of substantially 180° about a seal transverse axis 44.

In the fourth fitting position, the pressure fluid inlet 22 of the actuating unit 12 is in fluid communication with the pressure fluid inlet 26 of the pilot valve unit 16 via the through opening 18c. To this end, the holes 21f and 21g are each in fluid communication with the through opening 18c, which is ensured by an appropriate arrangement of the seal 18.

The pressure fluid outlet 24 of the actuating unit 12 is in fluid communication with the pressure fluid return 28 of the pilot valve unit 16 via the through opening 18f, for which the holes 21a and 21h are each in fluid communication with the through opening 18f. The seal 18 is positioned appropriately.

The first pressure chamber 20a is additionally in fluid communication with the second pressure fluid outlet 30b of the pilot valve unit 16 via the through opening 18b. This is achieved in that the holes 21d and 21e are in fluid communication with the through opening 18b due to an appropriate arrangement of the seal 18.

The second pressure chamber 20b is in fluid communication with the first pressure fluid working outlet 30a of the pilot valve unit 16 via the through opening 18d. To this end, the holes 21b and 21c are also in fluid communication with the through opening 18d. This is again achieved by an appropriate position of the seal 18.

As already explained, the through openings 18b and 18d are configured as elongated holes such that the first pressure fluid working outlet 30a and the second pressure chamber 20b are in fluid communication with each other via an elongated hole, and the second pressure fluid working outlet 30b and the first pressure chamber 20a are in fluid communication with each other via an elongated hole.

Analogously to the process valve 10 of FIG. 6, the process valve 10 represented in FIG. 7 is also a switching valve having a double-action drive.

It can be configured as an NO or NC valve analogously to the above explanations, an NO valve becoming an NC valve or vice versa by the transfer of the seal 18 from the third fitting position (see FIG. 6) into the fourth position (see FIG. 7). The same applies to a transfer of the seal 18 from the fourth fitting position (see FIG. 7) into the third fitting position (see FIG. 6).

Figure 8:
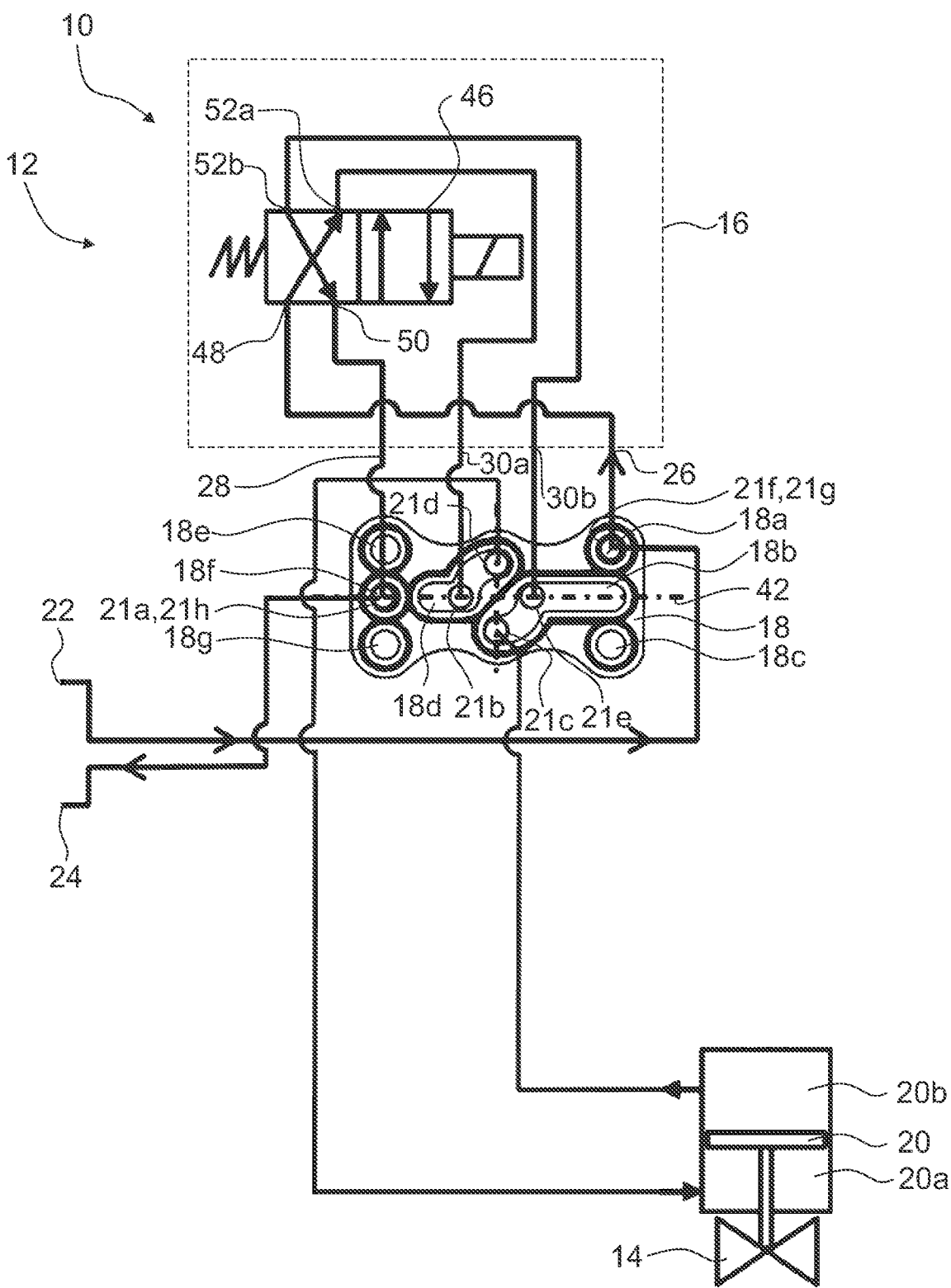
FIG. 8 shows a process valve according to the invention comprising an actuating unit according to the invention in a fourth embodiment, the seal taking up a third fitting position.

FIG. 8 shows a fourth embodiment of the actuating unit 12 and of the process valve 10.

In this embodiment, the pilot valve unit 16 comprises a 4/2-way valve 46 having a pressure fluid inlet 48 which is in fluid communication with the pressure fluid inlet 26 of the pilot valve unit 16.

Furthermore, the 4/2-way valve 46 has a pressure fluid return 50 which is in fluid communication with the pressure fluid return 28 of the pilot valve unit 16.

The 4/2-way valve 46 furthermore comprises a first pressure fluid working outlet 52a and a second pressure fluid working outlet 52b.

The first pressure fluid working outlet 52a is in fluid communication with the first pressure fluid outlet 30a of the pilot valve unit 16, and the second pressure fluid working outlet 52b is in fluid communication with the second pressure fluid working outlet 30b of the pilot valve unit 16.

On the basis of the actuating unit 12 shown in FIG. 6, the two 3/2-way valves 32a, 32b thus have been replaced by the 4/2-way valve 46.

In the variant shown in FIG. 8, the seal 18 is in the third fitting position such that concerning the interconnection of the pressure chambers 20a, 20b with the pressure fluid inlet 22, the pressure fluid outlet 24 and the pilot valve unit 16, reference can be made to the explanations of FIG. 6.

In the unactuated state of the 4/2-way valve 46, the first pressure chamber 20a is in fluid communication with the pressure fluid inlet 22, and the second pressure chamber 20b is in fluid communication with the pressure fluid outlet 24.

The piston 20 thus is in the upper end position of FIG. 8 with which a closed or open position of the process valve 10, more precisely of the valve unit 14 may be associated, such that the process valve 10 generally acts as an NC or NO valve.

Due to an actuation of the first 4/2-way valve 46, the first pressure chamber 20a is in fluid communication with the pressure fluid outlet 24 and the second pressure chamber 20b is in fluid communication with the pressure fluid inlet 22. The piston 20 is thus transferred into the lower end position in FIG. 8.

The process valve 10 of FIG. 8 is therefore also a switching valve having a double-action drive.

The 4/2-way valve 46 acts here like the two 3/2-way valves 32a, 32b of the actuating unit 12 of FIG. 6. It may therefore be referred to as functional substitute circuitry of the 3/2-way valves 32a, 32b.

Figure 9:
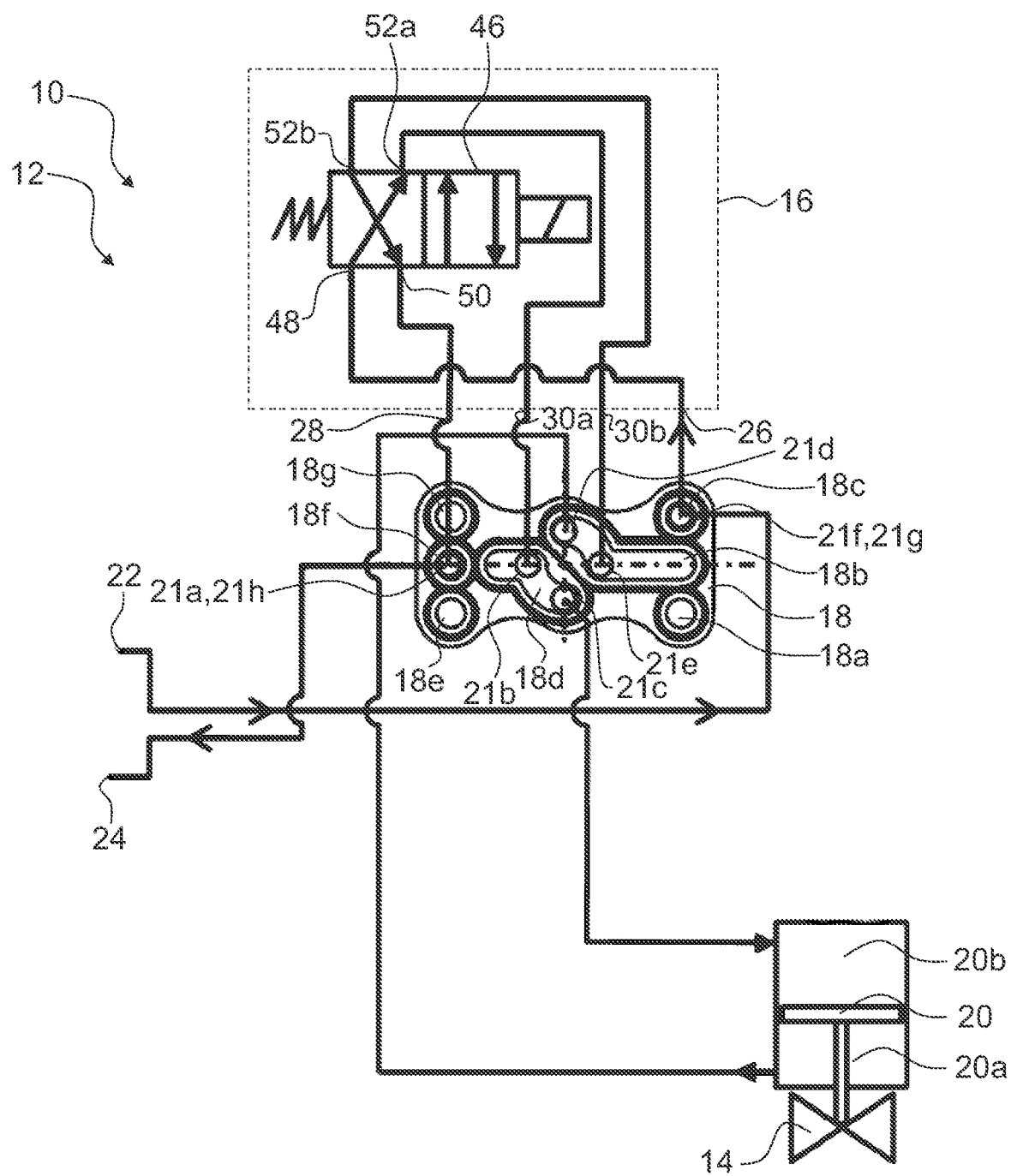
FIG. 9 shows the process valve according to the invention comprising the actuating unit according to the invention of FIG. 8, the seal taking up a fourth fitting position.

FIG. 9 shows a variant of the fourth embodiment.

It differs from the variant of FIG. 8 in that the seal 18 now takes up the fourth fitting position.

The interconnection of the pressure chambers 20a, 20b with the pressure fluid inlet 22, the pressure fluid outlet 24 and the pilot valve unit 16 has already been explained in connection with the actuating unit 12 represented in FIG. 7. Reference is made to these explanations.

The pilot valve unit 16 in the variant shown in FIG. 9 further corresponds to the pilot valve unit 16 of FIG. 8. Reference is made to the appropriate explanations.

The process valve 10 represented in FIG. 9 is thus also a switching valve having a double-action drive.

It can be configured as an NO or NC valve analogously to the above explanations, an NO valve becoming an NC valve or vice versa by the transfer of the seal 18 from the third fitting position (see FIG. 8) into the fourth position (see FIG.

9). The same applies to a transfer of the seal 18 from the fourth fitting position (see FIG. 9) into the third fitting position (see FIG. 8).

Figure 10:
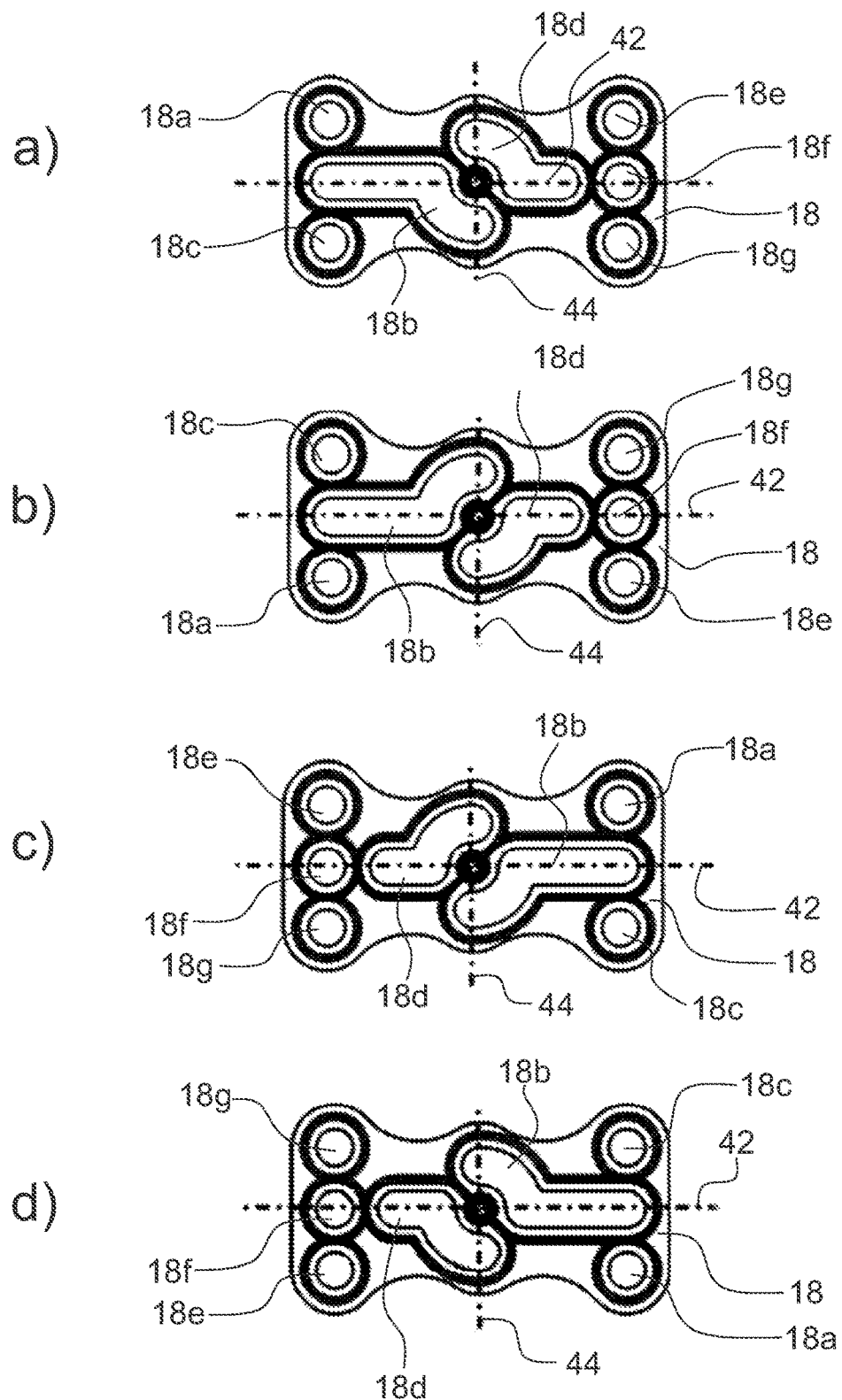
FIG. 10 shows, in a juxtaposition, the different fitting positions of the seal of the process valves of the invention having the actuating unit according to the invention of the previous figures.

FIG. 10 shows a summary of the four fitting positions of the seal 18.

FIG. 10*a*) shows the first fitting position of the seal 18 (see also FIGS. 1, 2 and 4), FIG. 10*b*) shows the second fitting position (see also FIGS. 3 and 5).

On the basis of the synopsis of FIGS. 10*a*) and 10*b*), it becomes clear again that the seal 18 may be transferred from the first fitting position into the second fitting position and vice versa by a rotation of substantially 180° about the seal longitudinal axis 42.

FIG. 10*c*) shows the third fitting position of the seal 18 (see also FIGS. 6 and 8). Starting from the first fitting position, it can be achieved by a rotation of the seal 18 of substantially 180° about the seal transverse axis 44.

FIG. 10*d*) represents the fourth fitting position of the seal 18. Starting from the third position, the seal 18 may be transferred into the fourth fitting position by a rotation of substantially 180° about the seal longitudinal axis 42.

Alternatively, the seal 18 can be transferred from the second fitting position into the fourth fitting position by a rotation of substantially 180° about the seal transverse axis 44.

As already mentioned, the actuating unit described above may be a pneumatic piston actuating drive or also a pneumatic membrane actuating drive.

The invention claimed is:

1. An actuating unit for a process valve, comprising
a pilot valve unit,
a separate removable seal arranged between two parts through which a fluid can flow, and
a piston configured for adjustment of the process valve,
the seal being adapted to take up different fitting positions which differ from each other by a rotation of the seal about at least one axis and by arrangement of the seal with respect to the two parts arranged adjacent to the seal,
the seal having through openings for the passage of fluid, and the parts adjacent to the seal having a plurality of holes, wherein
at least a first of the holes is connected to a pressure fluid inlet of the actuating unit,
at least a second of the holes is connected to a pressure fluid outlet of the actuating unit,
at least a third of the holes is connected to a first pressure chamber adjoining the piston,
at least a fourth of the holes is connected to a second pressure chamber adjoining the piston,
at least a fifth of the holes forms a pressure fluid inlet of the pilot valve unit,
at least a sixth of the holes forms a pressure fluid return of the pilot valve unit, and
at least a seventh of the holes forms a first pressure fluid working outlet of the pilot valve unit,
wherein different ones of said holes are in fluid communication with each other via the through openings of the seal or are fluidically separated due to an intermediate wall portion of the seal depending on the fitting position of the seal,
the through openings and the holes being arranged unsymmetrically with respect to the at least one axis such that
in a first fitting position, the seal brings the first pressure chamber adjoining the piston in fluid communication with the first pressure fluid working outlet of the pilot valve unit, and brings the second pressure chamber adjoining the piston in fluid communication with the pressure fluid outlet of the actuating unit, the first pressure chamber and the second pressure chamber being arranged on opposite sides of the piston, and
in a second fitting position, the seal brings the second pressure chamber in fluid communication with the first pressure fluid working outlet of the pilot valve unit, and brings the first pressure chamber in fluid communication with the pressure fluid outlet of the actuating unit.

2. The actuating unit according to claim 1, wherein the seal can be transferred from the first fitting position into the second fitting position and vice versa by a rotation of substantially 180°.

3. The actuating unit according to claim 1, wherein in the first fitting position of the seal at least one of the following connections is established:
the pressure fluid outlet of the actuating unit, the pressure fluid return, and the second pressure chamber are in fluid communication with each other via a through opening which is configured as an elongated hole, and
the first pressure fluid working outlet and the first pressure chamber are in fluid communication with each other via a through opening which is configured as an elongated hole.

4. The actuating unit according to claim 1, wherein in the second fitting position of the seal at least one of the following connections is established:
the pressure fluid outlet of the actuating unit, the pressure fluid return, and the first pressure chamber are in fluid communication with each other via a through opening which is configured as an elongated hole and
the first pressure fluid working outlet and the second pressure chamber are in fluid communication with each other via a through opening which is configured as an elongated hole.

5. The actuating unit according to claim 1, wherein an elastic element which pretensions the piston in the direction of an end position is arranged in one of the first pressure chamber and the second pressure chamber.

6. The actuating unit according to claim 1,
wherein at least one eighth hole forms a second pressure fluid working outlet of the pilot valve unit, wherein the through openings and the holes are arranged unsymmetrically with respect to the at least one axis such that
in a third fitting position, the seal brings the first pressure chamber adjoining the piston in fluid communication with the first pressure fluid working outlet of the pilot valve unit, and brings the second pressure chamber adjoining the piston in fluid communication with the second pressure fluid working outlet of the pilot valve unit, the first pressure chamber and the second pressure chamber being arranged on opposite sides of the piston.

7. The actuating unit according to claim 6, wherein in the third fitting position of the seal at least one of the following connections is established:
the first pressure chamber and the first pressure fluid working outlet are in fluid communication with each other via a through opening which is configured as an elongated hole and
the second pressure chamber and the second pressure fluid working outlet are in fluid communication with each other via a through opening which is configured as an elongated hole.

8. The actuating unit according to claim 6, wherein the pilot valve unit comprises two 3/2-way valves, wherein the pressure fluid inlet of the pilot valve unit is in fluid communication with a pressure fluid inlet of a first 3/2-way valve and with a pressure fluid inlet of a second 3/2-way valve, the pressure fluid return of the pilot valve unit is in fluid communication with a pressure fluid return of the first 3/2-way valve and with a pressure fluid return of a second 3/2-way valve, the first pressure fluid working outlet of the pilot valve unit is in fluid communication with a pressure fluid working outlet of the first 3/2-way valve, and the second pressure fluid working outlet of the pilot valve unit is in fluid communication with a pressure fluid working outlet of the second 3/2-way valve.

9. The actuating unit according to claim 6, wherein the pilot valve unit comprises a 4/2-way valve, wherein the pressure fluid inlet of the pilot valve unit is in fluid communication with a pressure fluid inlet of the 4/2-way valve, the pressure fluid return of the pilot valve unit is in fluid communication with a pressure fluid return of the 4/2-way valve, the first pressure fluid working outlet of the pilot valve unit is in fluid communication with a first pressure fluid working outlet of the 4/2-way valve, and the second pressure fluid working outlet of the pilot valve unit is in fluid communication with a second pressure fluid working outlet of the 4/2-way valve.

10. The actuating unit according to claim 1, wherein at least one hole forms a second pressure fluid working outlet of the pilot valve unit, wherein the through openings and the holes are arranged unsymmetrically with respect to the at least one axis such that in a fourth fitting position, the seal brings the first pressure chamber adjoining the piston in fluid communication with the second pressure fluid working outlet of the pilot valve unit, and brings the second pressure chamber adjoining the piston in fluid communication with the first pressure fluid working outlet of the pilot valve unit, the first pressure chamber and the second pressure chamber being arranged on opposite sides of the piston.

11. The actuating unit according to claim 10, wherein the seal can be transferred from the third fitting position into the fourth fitting position and vice versa by a rotation of substantially 180°.

12. The actuating unit according to claim 10, wherein in the fourth fitting position of the seal at least one of the following connections is established:

the first pressure chamber and the second pressure fluid working outlet are in fluid communication with each other via a through opening which is configured as an elongated hole and the second pressure chamber and the first pressure fluid working outlet are in fluid communication with each other via a through opening which is configured as an elongated hole.

13. The actuating unit according to claim 1, wherein the pilot valve unit comprises a 3/2-way valve, wherein the pressure fluid inlet of the pilot valve unit is in fluid communication with a pressure fluid inlet of the 3/2-way valve, the pressure fluid return of the pilot valve unit is in fluid communication with a pressure fluid return of the 3/2-way valve, and the first pressure fluid working outlet of the pilot valve unit is in fluid communication with a pressure fluid working outlet of the 3/2-way valve.

14. The actuating unit according to claim 1, wherein the pilot valve unit comprises two 3/2-way valves, wherein the pressure fluid inlet of the pilot valve unit is a pressure fluid inlet of a first 3/2-way valve, the pressure fluid return of the pilot valve unit is a pressure fluid return of a second 3/2-way valve, and the first pressure fluid working outlet of the pilot valve unit is in fluid communication with a pressure fluid working outlet of the first 3/2-way valve, a pressure fluid return of the first 3/2-way valve, a pressure fluid inlet of the second 3/2-way valve and a pressure fluid working outlet of the second 3/2-way valve.

15. The actuating unit and process valve according to claim 1, wherein the actuating unit is positioned functionally within the process valve.

16. An actuating unit for a process valve, comprising a pilot valve unit, a separate removable seal arranged between two parts through which a fluid can flow, and a piston configured for adjustment of the process valve, the seal being adapted to take up different fitting positions which differ from each other by a rotation of the seal about at least one axis and by the arrangement of the seal with respect to the two parts arranged adjacent to the seal, the seal having through openings for the passage of fluid, and the parts adjacent to the seal having a plurality of holes, wherein at least a first of the holes is connected to a pressure fluid inlet of the actuating unit, at least a second of the holes is connected to a pressure fluid outlet of the actuating unit, at least a third of the holes is connected to a first pressure chamber adjoining the piston, at least a fourth of the holes is connected to a second pressure chamber adjoining the piston, at least a fifth of the holes forms a pressure fluid inlet of the pilot valve unit, at least a sixth of the holes forms a pressure fluid return of the pilot valve unit, and at least a seventh of the holes forms a first pressure fluid working outlet of the pilot valve unit, at least an eighth of the holes forms a second pressure fluid working outlet of the pilot valve unit, different holes being in fluid communication with each other via the through openings of the seal or fluidically separated due to an intermediate wall portion of the seal depending on the fitting position of the seal, the through openings and the holes being arranged unsymmetrically with respect to the at least one axis such that in a third fitting position, the seal brings the first pressure chamber adjoining the piston in fluid communication with the first pressure fluid working outlet of the pilot valve unit, and brings the second pressure chamber adjoining the piston in fluid communication with the second pressure fluid working outlet of the pilot valve unit, the first pressure chamber and the second pressure chamber being arranged on opposite sides of the piston.

17. The actuating unit according to claim 16, wherein in the third fitting position of the seal at least one of the following connections is established:

the first pressure chamber and the first pressure fluid working outlet are in fluid communication with each other via a through opening which is configured as an elongated hole and the second pressure chamber and the second pressure fluid working outlet are in fluid communication with each other via a through opening which is configured as an elongated hole.

18. The actuating unit according to claim 16,
wherein the through openings and the holes are arranged unsymmetrically with respect to the at least one axis such that in a fourth fitting position,
the seal brings the first pressure chamber adjoining the piston in fluid communication with the second pressure fluid working outlet of the pilot valve unit, and brings the second pressure chamber adjoining the piston in fluid communication with the first pressure fluid working outlet of the pilot valve unit, the first pressure chamber and the second pressure chamber being arranged on opposite sides of the piston.

19. The actuating unit according to claim 18, wherein the seal can be transferred from the third fitting position into the fourth fitting position and vice versa by a rotation of substantially 180°.

20. The actuating unit according to claim 18, wherein in the fourth fitting position of the seal at least one of the following connections is established:
the first pressure chamber and the second pressure fluid working outlet are in fluid communication with each other via a through opening which is configured as an elongated hole and
the second pressure chamber and the first pressure fluid working outlet are in fluid communication with each other via a through opening which is configured as an elongated hole.

21. The actuating unit according to claim 16, wherein the pilot valve unit comprises a 3/2-way valve, wherein
the pressure fluid inlet of the pilot valve unit is in fluid communication with a pressure fluid inlet of the 3/2-way valve,
the pressure fluid return of the pilot valve unit is in fluid communication with a pressure fluid return of the 3/2-way valve, and
the first pressure fluid working outlet of the pilot valve unit is in fluid communication with a pressure fluid working outlet of the 3/2-way valve.

22. The actuating unit according to claim 16, wherein the pilot valve unit comprises two 3/2-way valves, wherein
the pressure fluid inlet of the pilot valve unit is a pressure fluid inlet of a first 3/2-way valve,
the pressure fluid return of the pilot valve unit is a pressure fluid return of a second 3/2-way valve, and
the first pressure fluid working outlet of the pilot valve unit is in fluid communication with a pressure fluid working outlet of the first 3/2-way valve, a pressure fluid return of the first 3/2-way valve, a pressure fluid inlet of the second 3/2-way valve and a pressure fluid working outlet of the second 3/2-way valve.

23. The actuating unit according to claim 16, wherein the pilot valve unit comprises two 3/2-way valves, wherein
the pressure fluid inlet of the pilot valve unit is in fluid communication with a pressure fluid inlet of a first 3/2-way valve and with a pressure fluid inlet of a second 3/2-way valve,
the pressure fluid return of the pilot valve unit is in fluid communication with a pressure fluid return of the first 3/2-way valve and with a pressure fluid return of a second 3/2-way valve,
the first pressure fluid working outlet of the pilot valve unit is in fluid communication with a pressure fluid working outlet of the first 3/2-way valve, and the second pressure fluid working outlet of the pilot valve unit is in fluid communication with a pressure fluid working outlet of the second 3/2-way valve.

24. The actuating unit according to claim 16, wherein the pilot valve unit comprises a 4/2-way valve, wherein
the pressure fluid inlet of the pilot valve unit is in fluid communication with a pressure fluid inlet of the 4/2-way valve,
the pressure fluid return of the pilot valve unit is in fluid communication with a pressure fluid return of the 4/2-way valve,
the first pressure fluid working outlet of the pilot valve unit is in fluid communication with a first pressure fluid working outlet of the 4/2-way valve, and
the second pressure fluid working outlet of the pilot valve unit is in fluid communication with a second pressure fluid working outlet of the 4/2-way valve.

25. The actuating unit and process valve according to claim 16, wherein the actuating unit is positioned functionally within the process valve.

26. An actuating unit for a process valve, comprising
a pilot valve unit,
a separate removable seal arranged between two parts through which a fluid can flow, and
a piston configured for adjustment of the process valve,
the seal being adapted to take up different fitting positions which differ from each other by a rotation of the seal about at least one axis and by the arrangement of the seal with respect to the two parts arranged adjacent to the seal,
the seal having through openings for the passage of fluid, and the parts adjacent to the seal having a plurality of holes, wherein
at least a first of the holes is connected to a pressure fluid inlet of the actuating unit,
at least a second of the holes is connected to a pressure fluid outlet of the actuating unit,
at least a third of the holes is connected to a first pressure chamber adjoining the piston,
at least a fourth of the holes is connected to a second pressure chamber adjoining the piston,
at least a fifth of the holes forms a pressure fluid inlet of the pilot valve unit,
at least a sixth of the holes forms a pressure fluid return of the pilot valve unit, and
at least a seventh of the holes forms a first pressure fluid working outlet of the pilot valve unit, and
at least an eighth of the holes forms a second pressure fluid working outlet of the pilot valve unit,
different holes being in fluid communication with each other via the through openings of the seal or fluidically separated due to an intermediate wall portion of the seal depending on the fitting position of the seal,
the through openings and the holes being arranged unsymmetrically with respect to the at least one axis such that in a fourth fitting position, the seal brings the first pressure chamber adjoining the piston in fluid communication with the second pressure fluid working outlet of the pilot valve unit, and brings the second pressure chamber adjoining the piston in fluid communication with the first pressure fluid working outlet of the pilot valve unit,
the first pressure chamber and the second pressure chamber being arranged on opposite sides of the piston.

27. The actuating unit according to claim 26, wherein in the fourth fitting position of the seal at least one of the following connections is established:

the first pressure chamber and the second pressure fluid working outlet are in fluid communication with each other via a through opening which is configured as an elongated hole and the second pressure chamber and the first pressure fluid working outlet are in fluid communication with each other via a through opening which is configured as an elongated hole.

28. The actuating unit according to claim 26, wherein the pilot valve unit comprises a 3/2-way valve, wherein the pressure fluid inlet of the pilot valve unit is in fluid communication with a pressure fluid inlet of the 3/2-way valve, the pressure fluid return of the pilot valve unit is in fluid communication with a pressure fluid return of the 3/2-way valve, and the first pressure fluid working outlet of the pilot valve unit is in fluid communication with a pressure fluid working outlet of the 3/2-way valve.

29. The actuating unit according to claim 26, wherein the pilot valve unit comprises two 3/2-way valves, wherein, the pressure fluid inlet of the pilot valve unit is a pressure fluid inlet of a first 3/2-way valve, the pressure fluid return of the pilot valve unit is a pressure fluid return of a second 3/2-way valve, and the first pressure fluid working outlet of the pilot valve unit is in fluid communication with a pressure fluid working outlet of the first 3/2-way valve, a pressure fluid return of the first 3/2-way valve, a pressure fluid inlet of the second 3/2-way valve and a pressure fluid working outlet of the second 3/2-way valve.

30. The actuating unit according claim 26, wherein the pilot valve unit comprises two 3/2-way valves, wherein the pressure fluid inlet of the pilot valve unit is in fluid communication with a pressure fluid inlet of a first 3/2-way valve and with a pressure fluid inlet of a second 3/2-way valve, the pressure fluid return of the pilot valve unit is in fluid communication with a pressure fluid return of the first 3/2-way valve and with a pressure fluid return of a second 3/2-way valve, the first pressure fluid working outlet of the pilot valve unit is in fluid communication with a pressure fluid working outlet of the first 3/2-way valve, and the second pressure fluid working outlet of the pilot valve unit is in fluid communication with a pressure fluid working outlet of the second 3/2-way valve.

31. The actuating unit according to claim 26, wherein the pilot valve unit comprises a 4/2-way valve, wherein the pressure fluid inlet of the pilot valve unit is in fluid communication with a pressure fluid inlet of the 4/2-way valve, the pressure fluid return of the pilot valve unit is in fluid communication with a pressure fluid return of the 4/2-way valve, the first pressure fluid working outlet of the pilot valve unit is in fluid communication with a first pressure fluid working outlet of 4/2-way valve, and the second pressure fluid working outlet of the pilot valve unit is in fluid communication with a second pressure fluid working outlet of the 4/2-way valve.

32. The actuating unit and process valve according to claim 26, wherein the actuating unit is positioned functionally within the process valve.

\* \* \* \* \*